United States Patent
Harris

(10) Patent No.: US 9,963,834 B2
(45) Date of Patent: May 8, 2018

(54) MONOLITHIC PAVER

(71) Applicant: Gilliam Harris Engineering, LLC, Columbus, MS (US)

(72) Inventor: Gilliam Stelling Harris, Columbus, MS (US)

(73) Assignee: GILLIAM HARRIS ENGINEERING, LLC, Columbus, MS (US)

( * ) Notice: Subject to any disclaimer, the term of this patent is extended or adjusted under 35 U.S.C. 154(b) by 0 days. days.

(21) Appl. No.: 15/642,564

(22) Filed: Jul. 6, 2017

(65) Prior Publication Data
US 2018/0030664 A1    Feb. 1, 2018

Related U.S. Application Data

(63) Continuation-in-part of application No. 15/475,200, filed on Mar. 31, 2017, which is a continuation of
(Continued)

(51) Int. Cl.
*E01C 5/08*    (2006.01)
*E01C 5/00*    (2006.01)
(Continued)

(52) U.S. Cl.
CPC .............. *E01C 5/005* (2013.01); *E01C 5/006* (2013.01); *E01C 5/04* (2013.01); *E01C 5/06* (2013.01);
(Continued)

(58) Field of Classification Search
CPC ..... E01C 5/00; E01C 5/08; E01C 5/20; E01C 13/04
(Continued)

(56) References Cited

U.S. PATENT DOCUMENTS

| 400,996 A | 4/1889 | Belden |
| 1,568,677 A | 1/1926 | McCanless |

(Continued)

FOREIGN PATENT DOCUMENTS

| CN | 103331817 A | 10/2013 |
| KR | 1020160031069 A | 3/2016 |

OTHER PUBLICATIONS

Hydrotech, "Waterproofing & Open Joint Paver Assembly for Plazas & Roof Decks", The Ultimate Assembly, 14 pages.
(Continued)

*Primary Examiner* — Gary S Hartmann
(74) *Attorney, Agent, or Firm* — Medley, Behrens & Lewis, LLC

(57) ABSTRACT

Various monolithic pavers are one-piece pavers with no seams, joints, or connections. A monolithic paver can be formed via three dimensional (3D) printing or molding. The monolithic paver is designed to carry applied loads to paver support(s) via structural members of the monolithic paver. The monolithic paver is formed to include parallel structural members that are spaced with gaps there between. The parallel structural members include top flanges and webs. The parallel structural members can also include bottom flanges. Moreover, the monolithic paver can have exterior sides that have tongues and grooves formed there along; tongues can be formed along adjoining exterior sides of the monolithic paver.

22 Claims, 19 Drawing Sheets

Related U.S. Application Data application No. 15/221,193, filed on Jul. 27, 2016, now Pat. No. 9,644,326.

(51) Int. Cl.
| | | |
|---|---|---|
| *E01C 5/06* | (2006.01) | |
| *E01C 5/04* | (2006.01) | |
| *E01C 5/14* | (2006.01) | |
| *E01C 5/20* | (2006.01) | |
| *E01C 13/04* | (2006.01) | |

(52) U.S. Cl.
CPC .................. *E01C 5/08* (2013.01); *E01C 5/14* (2013.01); *E01C 5/20* (2013.01); *E01C 13/04* (2013.01)

(58) Field of Classification Search
USPC ........................................ 404/34, 41, 44, 45
See application file for complete search history.

(56) References Cited

U.S. PATENT DOCUMENTS

| | | | |
|---|---|---|---|
| 3,873,225 A | 3/1975 | Jakobsen et al. | |
| 3,969,851 A | 7/1976 | Whitacre | |
| 4,655,018 A | 4/1987 | Pardo | |
| 4,865,486 A | 9/1989 | Bettigole | |
| 4,977,730 A | 12/1990 | Pardo | |
| 5,496,129 A | 3/1996 | Dube | |
| 6,049,932 A | 4/2000 | Mangone | |
| 6,267,531 B1 | 7/2001 | Clarke | |
| 6,705,797 B1 | 3/2004 | Wada | |
| 7,001,101 B1 | 2/2006 | DeRose | |
| 7,373,760 B2 | 5/2008 | Tokuno et al. | |
| 7,418,804 B2 | 9/2008 | Tokuno et al. | |
| 8,469,628 B2 | 6/2013 | Miller et al. | |
| 8,684,626 B2 | 4/2014 | Tonder et al. | |
| 8,696,235 B2 | 4/2014 | Ciccarello | |
| 8,747,018 B2 | 6/2014 | Smith et al. | |
| 8,863,463 B2 | 10/2014 | Bogeskov et al. | |
| 8,959,856 B2 | 2/2015 | Volkner et al. | |
| 9,079,347 B2 | 7/2015 | Chow | |
| 9,115,472 B2 | 8/2015 | Ciccarello | |
| 9,149,085 B2 | 11/2015 | Smith et al. | |
| 9,644,326 B1 | 5/2017 | Harris | |
| 2018/0030663 A1* | 2/2018 | Harris | ................ E01C 5/005 |

OTHER PUBLICATIONS

Hydrotech, "Hanover Guardian Roof Paver System", Tech Data, 3 pages.

"Bison Ipe, Cumaru, Massaranduba Wood Deck Tiles for Rooftop Decks", Retrieved at: <<http://www.bisonip.com/surfaces/wood-deck-tiles/>>, Retrieval date: Jul. 27, 2016, 3 pages.

"Office Action for U.S. Appl. No. 15/221,193", dated Oct. 3, 2016, 8 pages.

"Response to the Office Action for U.S. Appl. No. 15/221,193", filed Dec. 26, 2016, 23 pages.

"Office Action for U.S. Appl. No. 15/221,193", dated Feb. 24, 2017, 6 pages.

"Response to the Office Action for U.S. Appl. No. 15/221,193", filed Feb. 28, 2017, 10 pages.

"Notice of Allowance and Fees Due for U.S. Appl. No. 15/221,193", dated Mar. 21, 2017, 7 pages.

\* cited by examiner

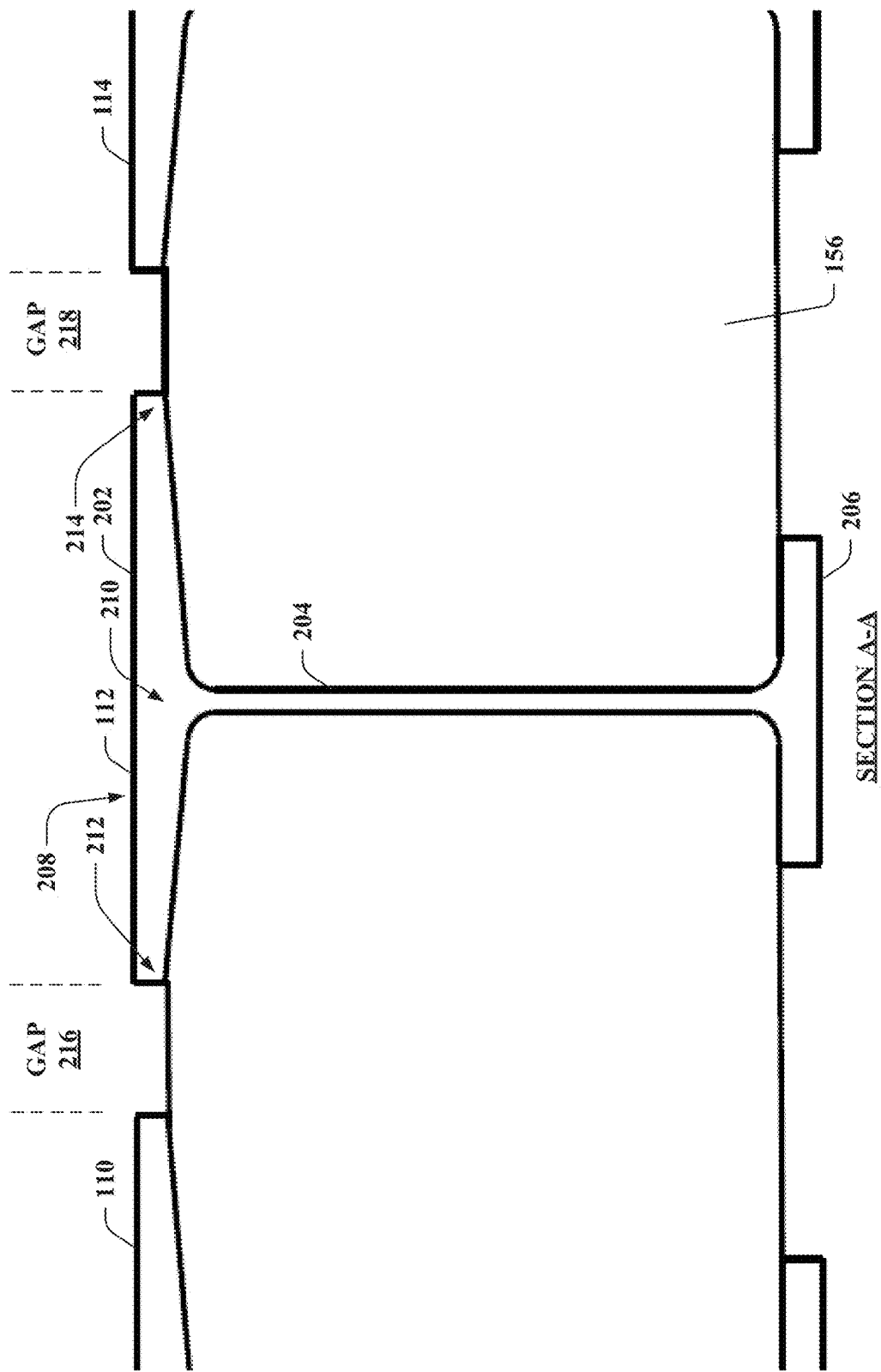

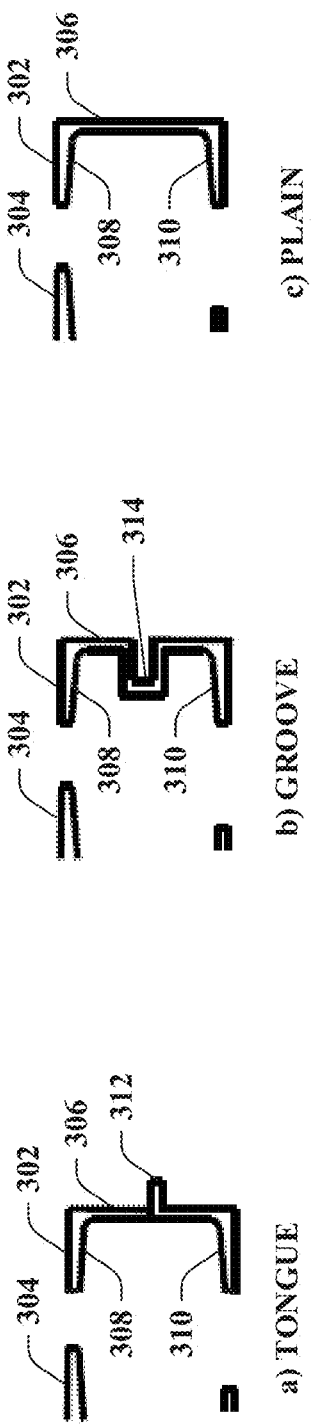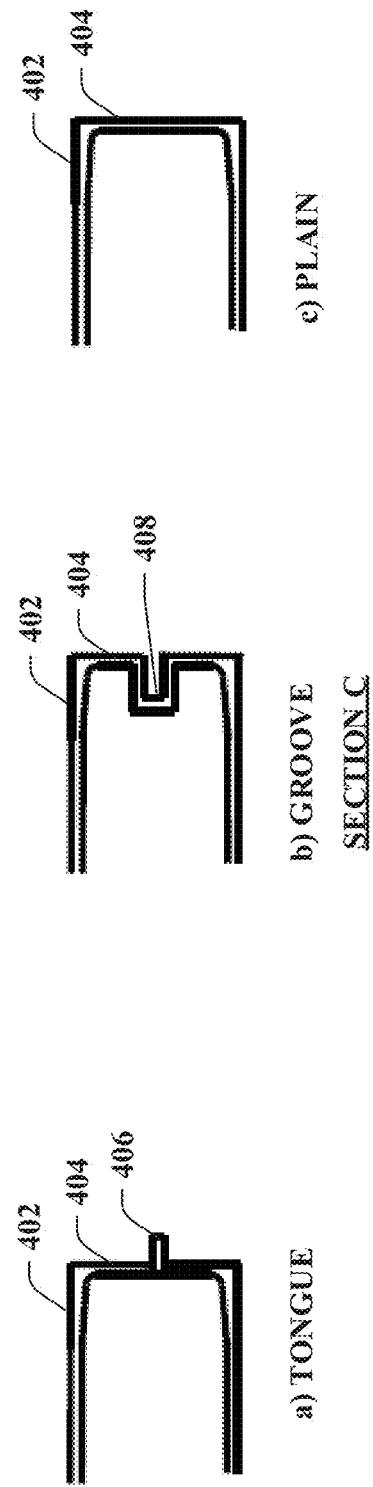

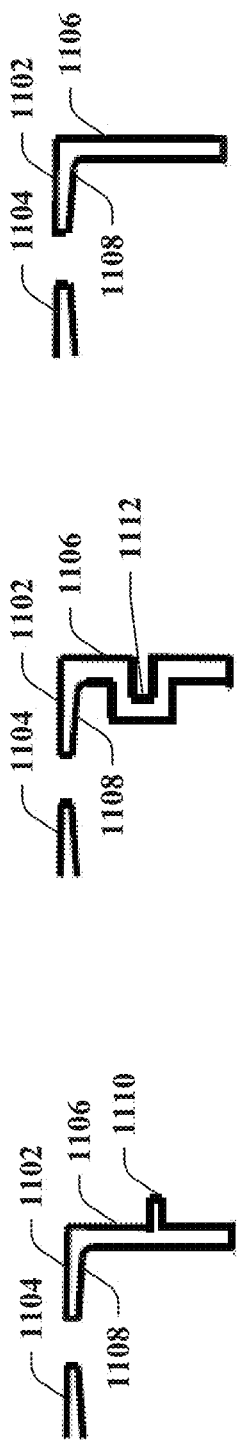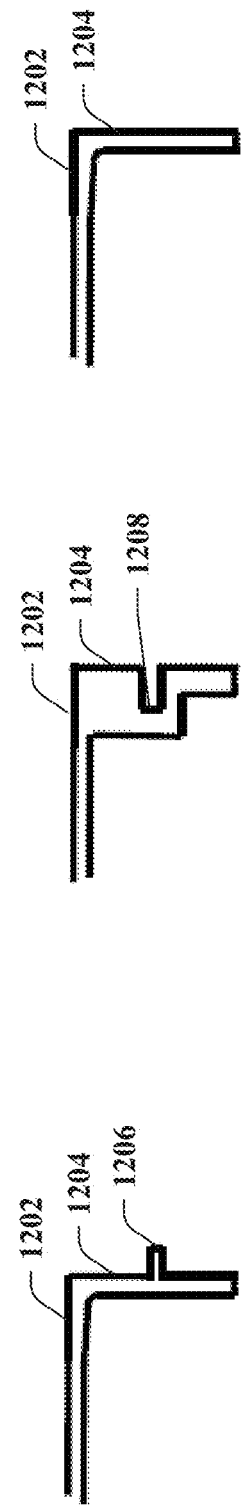
FIG. 11
FIG. 12

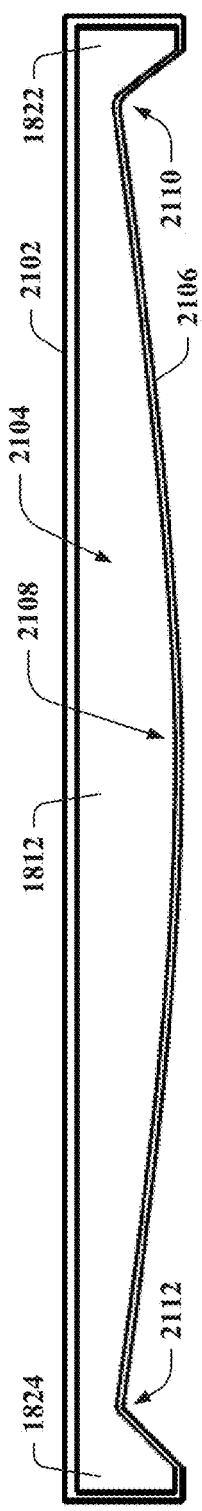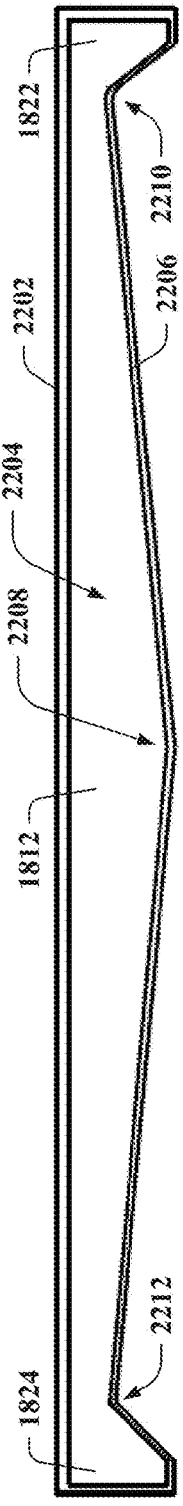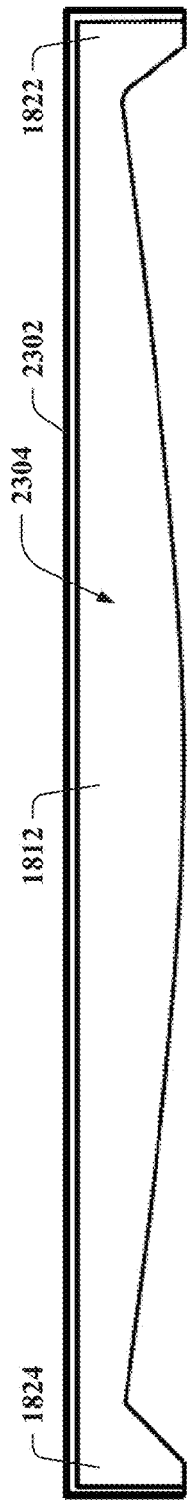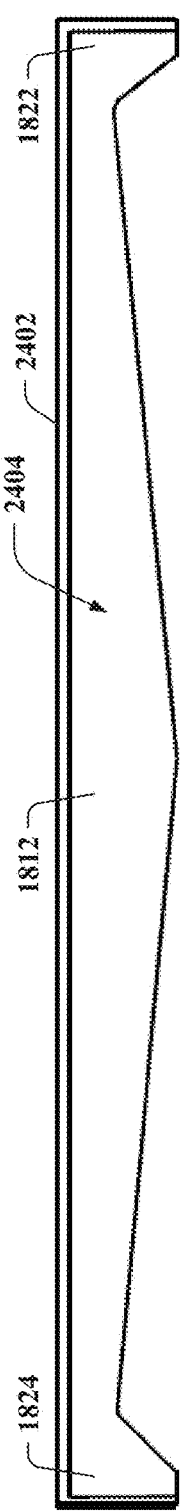

MONOLITHIC PAVER

CROSS-REFERENCE TO RELATED APPLICATIONS

This application is a continuation-in-part of U.S. patent application Ser. No. 15/475,200, filed on Mar. 31, 2017, and entitled "MONOLITHIC PAVER", which is a continuation of U.S. Pat. No. 9,644,326, filed on Jul. 27, 2016 (issued on May 9, 2017), and entitled "MONOLITHIC PAVER", the entireties of which are incorporated herein by reference.

BACKGROUND

Pavers oftentimes are used to form roads, driveways, patios, walkways, and other outdoor platforms. For instance, pavers can be used to create walking spaces, planted areas, or the like on top of buildings, on balconies, or at lower levels (e.g., on plazas and walkways). Pavers commonly are made of stone, tile, brick, brick-like pieces of concrete, wood, and so forth.

According to an illustration, a concrete paver can be made by pouring a mixture of concrete and coloring agent into a mold and allowing the concrete paver to set. Concrete pavers oftentimes include a steel frame that is filled with the concrete. Pursuant to another illustration, a wood paver can include a plurality of wooden slats in parallel, with a number of wooden boards positioned below the wooden slats. The wooden slats can be positioned across the wooden boards. The wooden slats and the wooden boards can be connected via nails, screws, adhesive, or the like.

Pavers can be applied (e.g., as flooring, a platform) by spreading sand on top of a foundation and laying the pavers in a desired pattern. In some instances, other than edging that surrounds the pavers, no adhesive or retaining mechanism needs to be used for the pavers to remain in place (e.g., the weight of the pavers cause the pavers to stay in place). In other instances, pavers can be positioned on pedestals. By way of illustration, edges or corners of pavers can be positioned on a pedestal; the edges or corners of the pavers may be connected to the pedestal.

SUMMARY

Described herein are various monolithic pavers. A monolithic paver can be used for roofs, balconies, plazas, patios, walkways, and other outdoor platforms. The monolithic paver described herein is a one-piece paver with no seams, joints, or connections. The monolithic paver can be formed via three dimensional (3D) printing or molding. The monolithic paver is designed to carry applied loads to paver support(s) (e.g., pedestal(s) that can be positioned below the monolithic paver) via structural members of the monolithic paver.

According to various embodiments, a monolithic paver can include a first side structural member, interior structural members, a second side structural member, a first end structural member, and a second end structural member. The first side structural member, the interior structural members, the second side structural member, the first end structural member, and the second end structural member can be integrally formed in one monolith (e.g., via 3D printing or molding). The first side structural member can have a first end, a second end, and a central portion between the first end and the second end along a length of the first side structural member. Moreover, the interior structural members can have first ends, second ends, and central portions between the first ends and the second ends along lengths of the interior structural members. The second side structural member can have a first end, a second end, and a central portion between the first end and the second end along a length of the second side structural member. Further, the first end structural member can have an interior side and the second end structural member can have an interior side. The interior structural members are between the first side structural member and the second side structural member in the monolithic paver. For instance, the first side structural member, the interior structural members, and the second side structural member can be in parallel with respect to each other in the monolithic paver. The first end of the first side structural member, the first ends of the interior structural members, and the first end of the second side structural member can be integrally formed with the interior side of the first end structural member. Moreover, the second end of the first side structural member, the second ends of the interior structural members, and the second end of the second side structural member can be integrally formed with the interior side of the second end structural member. The central portions of the interior structural members can include top flanges and webs. According to an embodiment, the central portions of the interior structural members can further include bottom flanges. Pursuant to another embodiment, the central portions of the interior structural members can lack bottom flanges.

In accordance with various embodiments, the first side structural member can have an exterior side, the second side structural member can have an exterior side, the first end structural member can have an exterior side, and the second end structural member can have an exterior side. A tongue can be formed along the exterior side of the first side structural member and a tongue can be formed along the exterior side of the first end structural member. According to an example, a groove can be formed along the exterior side of the second side structural member and a groove can be formed along the exterior side of the second end structural member. According to another example, a groove can be formed along the exterior side of the second side structural member and the exterior side of the second end structural member can be plain. Pursuant to yet another example, the exterior side of the second side structural member can be plain and a groove can be formed along the exterior side of the second end structural member.

Gaps through the monolithic paver can be defined between the central portion of the first side structural member, the central portions of the interior structural members, and the central portion of the second side structural member. The gaps can provide air permeability to resist uplift from wind forces. The gaps can also provide drainage if the monolithic paver is used as part of a planted area. Moreover, the monolithic paver can include a diaphragm, which can join the top flanges and the webs. The diaphragm can further join the bottom flanges for embodiments where the central portions of the interior structural members include the bottom flanges. The diaphragm can be integrally formed in the one monolith with the first side structural member, the interior structural members, the second side structural member, the first end structural member, and the second end structural member.

According to various embodiments, the interior structural members can be symmetrical beams, tubular beams, open web structural members, varying depth structural members, and/or constant depth structural members (e.g., an interior structural member can be both a symmetrical beam and a constant depth structural member). Moreover, it is contemplated that the first side structural member, the second side structural member, the first end structural member, and the second end structural member can be symmetrical beams, tubular beams, open web structural members, varying depth structural members, and/or constant depth structural members. For instance, the side structural members can be the same as the end structural members, the side structural members can differ from the end structural members, the interior structural members can be the same as the side structural members and/or the end structural members, or the interior structural members can differ from the side structural members and/or the end structural members.

The above summary presents a simplified summary in order to provide a basic understanding of some aspects of the monolithic pavers discussed herein. This summary is not an extensive overview of the monolithic pavers discussed herein. It is not intended to identify key/critical elements or to delineate the scope. Its sole purpose is to present some concepts in a simplified form as a prelude to the more detailed description that is presented later.

BRIEF DESCRIPTION OF THE DRAWINGS

FIG. 2 illustrates a cross-sectional view of a section A-A of the monolithic paver shown in FIG. 1.

FIG. 3 illustrates exemplary cross-sectional views of a section B of the monolithic paver of FIG. 1.

FIG. 4 illustrates exemplary cross-sectional views of a section C of the monolithic paver of FIG. 1.

FIG. 11 illustrates exemplary cross-sectional views of a section G of the monolithic paver of FIG. 9.

FIG. 12 illustrates exemplary cross-sectional views of a section H of the monolithic paver of FIG. 9.

FIGS. 19-26 illustrate cross-sectional views of exemplary structural members (section J-J) of the monolithic paver shown in FIG. 18.

DETAILED DESCRIPTION

Figure 1:
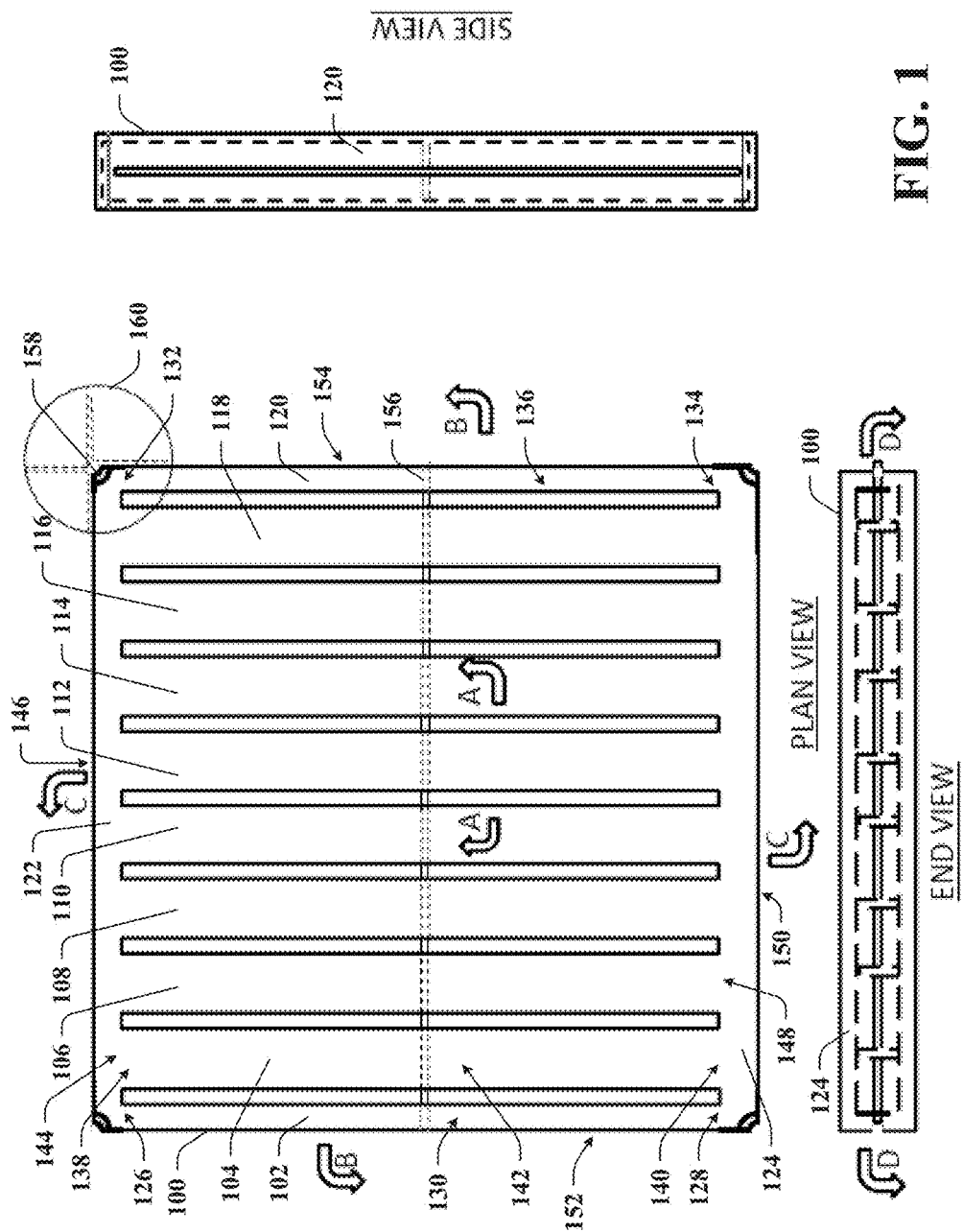
FIG. 1 illustrates an exemplary monolithic paver according to an embodiment.

Various technologies pertaining to monolithic pavers are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates an exemplary monolithic paver 100. FIG. 1 includes a plan view, an end view, and a side view of the monolithic paver 100. The monolithic paver 100 is a one-piece paver with no seams, joints, or connections. In the embodiment shown in FIG. 1, the monolithic paver 100 can be formed via three dimensional (3D) printing. The monolithic paver 100 can be used for roofs, balconies, plazas, patios, walkways, and other outdoor platforms, for example. Moreover, the monolithic paver 100 is designed to carry applied loads to paver support(s) (e.g., pedestal(s) that can be positioned below the monolithic paver 100) via structural members of the monolithic paver 100. The structural members of the monolithic paver 100 can be structurally efficient, such that material from which the monolithic paver 100 is formed is conserved. According to an example, a size of the monolithic paver 100 can be 2 feet by 2 feet by 2 inches; however, it is contemplated that substantially any size monolithic paver is intended to fall within the scope of the hereto appended claims. Moreover, it is contemplated that other shapes of the monolithic paver 100 can fall within the scope of the hereto appended claims, particularly for a monolithic paver at a non-orthogonal boundary. Further, the monolithic paver 100 can be made from a material such as aluminum, plastic, plain or reinforced concrete, or the like.

The monolithic paver 100 includes a first side structural member 102 and a second side structural member 120. The monolithic paver 100 also includes a plurality of interior structural members. In particular, in the example shown in FIG. 1, the monolithic paver 100 includes eight interior structural members 104, 106, 108, 110, 112, 114, 116, and 118 (collectively referred to herein as interior structural members 104-118). While the monolithic paver 100 is depicted as including eight interior structural members 104-118, it is to be appreciated that more or less than eight interior structural members 104-118 can be included in the monolithic paver 100. The monolithic paver 100 further includes a first end structural member 122 and a second end structural member 124.

As shown in the plan view in FIG. 1, the interior structural members 104-118 are between the first side structural member 102 and the second side structural member 120. Moreover, the first side structural member 102, the interior structural members 104-118, and the second side structural member 120 can be in parallel with respect to each other in the monolithic paver 100 as depicted in the plan view.

The first side structural member 102 includes a first end 126, a second end 128, and a central portion 130 between the first end 126 and the second end 128 along a length of the first side structural member 102. Likewise, the second side structural member 120 includes a first end 132, a second end 134, and a central portion 136 between the first end 132 and the second end 134 along a length of the second side structural member 120. The interior structural members 104-118 similarly include first ends, second ends, and central portions between the first ends and the second ends along lengths of the interior structural members 104-118. For instance, the interior structural member 104 includes a first end 138, a second end 140, and a central portion 142 between the first end 138 and the second end 140 along a length of the interior structural member 104.

The first end structural member 122 further includes an interior side 144 and an exterior side 146. Likewise, the second end structural member 124 includes an interior side 148 and an exterior side 150. The exterior side 150 of the second end structural member 124 is shown in the end view of the monolithic paver 100 in FIG. 1. Additionally, the first side structural member 102 includes an exterior side 152, and the second side structural member 120 includes an exterior side 154. The exterior side 154 of the second side structural member 120 is shown in the side view of the monolithic paver 100 in FIG. 1.

The first end 126 of the first side structural member 102, the first ends of the interior structural members 104-118 (e.g., the first end 138 of the interior structural member 104, the first ends of the remaining interior structural members 106-118), and the first end 132 of the second side structural member 120 are integrally formed with the interior side 144 of the first end structural member 122. Moreover, the second end 128 of the first side structural member 102, the second ends of the interior structural members 104-118 (e.g., the second end 140 of the interior structural member 104, the second ends of the remaining interior structural members 106-118), and the second end 134 of the second side structural member 120 are integrally formed with the interior side 148 of the second end structural member 124. The ends are integrally formed with the sides as set forth herein via the 3D printing process such that no seams, joints, or connections exist there between. Accordingly, the first side structural member 102, the interior structural members 104-118, the second side structural member 120, the first end structural member 122, and the second end structural member 124 can be integrally formed in one monolith; thus, the monolithic paver 100 is a one-piece paver.

Gaps through the monolithic paver 100 can be defined between the central portion 130 of the first side structural member 102, the central portions of the interior structural members 104-118 (e.g., a central portion 142 of the interior structural member 104, central portions of the remaining interior structural members 106-118), and the central portion 136 of the second side structural member 120. Accordingly, the structural members of the monolithic paver 100 are spaced with gaps between them. The gaps can provide air permeability to resist uplift from wind forces. Moreover, the gaps can provide drainage if the monolithic paver 100 is used as part of a planted area.

Further, the monolithic paver 100 can include a diaphragm 156. The diaphragm 156, the first end structural member 122, and the second end structural member 124 can be in parallel with respect to each other in the monolithic paver 100 as depicted in the plan view of FIG. 1. Moreover, the diaphragm 156 can be integrally formed in the one monolith with the first side structural member 102, the interior structural members 104-118, the second side structural member 120, the first end structural member 122, and the second end structural member 124.

Now referring to FIG. 2, illustrated is a cross-sectional view of a section A-A of the monolithic paver 100 shown in FIG. 1. A cross-section of the interior structural member 112 is depicted in FIG. 2. Also shown in FIG. 2 are portions of the interior structural member 110 and the interior structural member 114 as well as a portion of the diaphragm 156.

As illustrated in FIG. 2, the interior structural member 112 includes a top flange 202, a web 204, and a bottom flange 206 (e.g., the central portion of the interior structural member 112 includes the top flange 202, the web 204, and the bottom flange 206). Again, the top flange 202, the web 204, and the bottom flange 206 are integrally formed (e.g., via the 3D printing) as part of one monolith. It is also contemplated that the other interior structural members 104-110 and 114-118 (e.g., the central portions of such interior structural members) of the monolithic paver 100 likewise include respective top flanges, webs, and bottom flanges. Thus, the other interior structural members 104-110 and 114-118 can be substantially similar to the interior structural member 112 described in greater detail herein.

The flanges and webs of the monolithic paver 100 allow for conserving material from which the monolithic paver 100 is formed (compared to a design where interior structural members have a rectangular cross-section). The flanges and webs also allow for reducing a weight of the monolithic paver 100 (compared to a design where the structural members have a rectangular cross-section).

The interior structural member 112 can be a symmetrical beam. The top flange 202 and the bottom flange 206 resist bending moment experienced by the beam, and the web 204 resists shear forces. The top flange 202 can be cantilevered. Moreover, the top flange 202 can be tapered, such that the top flange 202 is thicker at its root 210 and thinner at its toe 212, as depicted in FIG. 2. A top surface 208 of the top flange 202 can provide a surface on which someone can walk, a planting surface, or the like. Further, the web 204 can provide a vertical support for the top flange 202. According to an example, the top flange 202 can be wider than the bottom flange 206. The top flange 202 can be wider, since the top flange 202 can be in compression and subject to buckling, whereas the bottom flange 206 can be in tension and not subject to buckling.

The interior structural member 112 can be in parallel with the interior structural member 110 and the interior structural member 114 (as well as the remaining interior structural members 104-108 and 116-118, the first side structural member 102, and the second side structural member 120). A gap 216 can be defined between a toe 212 of the top flange 202 of the interior structural member 112 and a toe of a top flange of the interior structural member 110. Similarly, a gap 218 can be defined between an opposing toe 214 of the top flange 202 of the interior structural member 112 and a toe of a top flange of the interior structural member 114.

The gaps between the central portions of the first side structural member 102, the interior structural members 104-118, and the second side structural member 120 can provide air permeability. For instance, if the monolithic paver 100 were to be applied in an area where a hurricane were to occur, the wind would be less likely to pick up the monolithic paver 100 (as compared to a paver that lacks gaps there through), since air can flow through the gaps defined by the monolithic paver 100. Moreover, widths of the gaps 216-218 (as well as other gaps defined through the monolithic paver 100) can be based on use of the monolithic paver 110. For instance, the gaps can be wider for walking surfaces and narrower for planting surfaces; however, the claimed subject matter is not so limited.

Further, the diaphragm 156 can join the top flanges, the webs, and the bottom flanges (e.g., the top flange 202, the web 204, and the bottom flange 206 of the interior structural member 112 can be joined with other top flanges, webs, and bottom flanges of the monolithic paver 100 by the diaphragm 156). Thus, the diaphragm 156 can connect the first side structural member 102, the interior structural members 104-118, and the second side structural member 120. Accordingly, the diaphragm 156 can mitigate torsional flexural buckling, thereby enhancing steadiness of the structural members (and the monolithic paver 100 more generally).

Now turning to FIG. 3, illustrated are exemplary cross-sectional views of a section B of the monolithic paver 100 of FIG. 1. Exemplary cross-sections of a side structural member 302 and a portion of an interior structural member 304 are depicted in FIG. 3. For example, the side structural member 302 can be the first side structural member 102 and the interior structural member 304 can be the interior structural member 104. According to another example, the side structural member 302 can be the second side structural member 120 and the interior structural member 304 can be the interior structural member 118.

The side structural member 302 includes an exterior side 306 (e.g., the exterior side 152 of the first side structural member 102 and the exterior side 154 of the second side structural member 120). The side structural member 302 also includes a top flange 308 and a bottom flange 310. Moreover, as depicted in FIG. 3, a gap can be defined (e.g., through the monolithic paver 100) between the side structural member 302 and the interior structural member 304.

View (a) of FIG. 3 depicts an example in which a tongue 312 is formed along the exterior side 306 of the side structural member 302. View (b) of FIG. 3 shows an example in which a groove 314 is formed along the exterior side 306 of the side structural member 302. Moreover, view (c) of FIG. 3 illustrates an example in which the exterior side 306 of the side structural member 302 is plain (e.g., the exterior side 306 lacks a tongue and lacks a groove).

Now referring to FIG. 4, illustrated are exemplary cross-sectional views of a section C of the monolithic paver 100 of FIG. 1. Exemplary cross-sections of an end structural member 402 (e.g., the first end structural member 122 or the second end structural member 124) are shown in FIG. 4. Moreover, the end structural member 402 includes an exterior side 404 (e.g., the exterior side 146 of the first end structural member 122 or the exterior side 150 of the second end structural member 124).

View (a) of FIG. 4 shows an example in which a tongue 406 is formed along the exterior side 404 of the end structural member 402. View (b) of FIG. 4 depicts an example in which a groove 408 is formed along the exterior side 404 of the end structural member 402. View (c) of FIG. 4 depicts an example in which the exterior side 404 of the end structural member 402 is plain (e.g., the exterior side 404 lacks a tongue and lacks a groove).

Reference is again made to FIG. 1. According to an example, the first side structural member 102 can have a tongue (e.g., the tongue 312) formed along the exterior side 152, and the first end structural member 122 can have a tongue (e.g., the tongue 406) formed along the exterior side 146. Following this example, the second side structural member 120 can have a groove (e.g., the groove 314) formed along the exterior side 154, and the second end structural member 124 can have a groove (e.g., the groove 408) formed along the exterior side 150.

Pursuant to another example, the first side structural member 102 can have a tongue (e.g., the tongue 312) formed along the exterior side 152, and the first end structural member 122 can have a tongue (e.g., the tongue 406) formed along the exterior side 146. According to this example, the second side structural member 120 can have a groove (e.g., the groove 314) formed along the exterior side 154. Moreover, the second end structural member 124 can be plain (as shown in view (c) of FIG. 4).

In accordance with yet another example, the first side structural member 102 can have a tongue (e.g., the tongue 312) formed along the exterior side 152, and the first end structural member 122 can have a tongue (e.g., the tongue 406) formed along the exterior side 146. According to this example, the second side structural member 120 can be plain (as shown in view (c) of FIG. 3). Further, the second end structural member 124 can have a groove (e.g., the groove 408) formed along the exterior side 150.

It is to be appreciated, however, that the claimed subject matter is not limited to the foregoing examples. For instance, it is contemplated that two or more of the exterior sides can be plain, one of the exterior sides can have a tongue formed thereupon, three or more of the exterior sides can have a tongue formed thereupon, and so forth.

Figure 5:
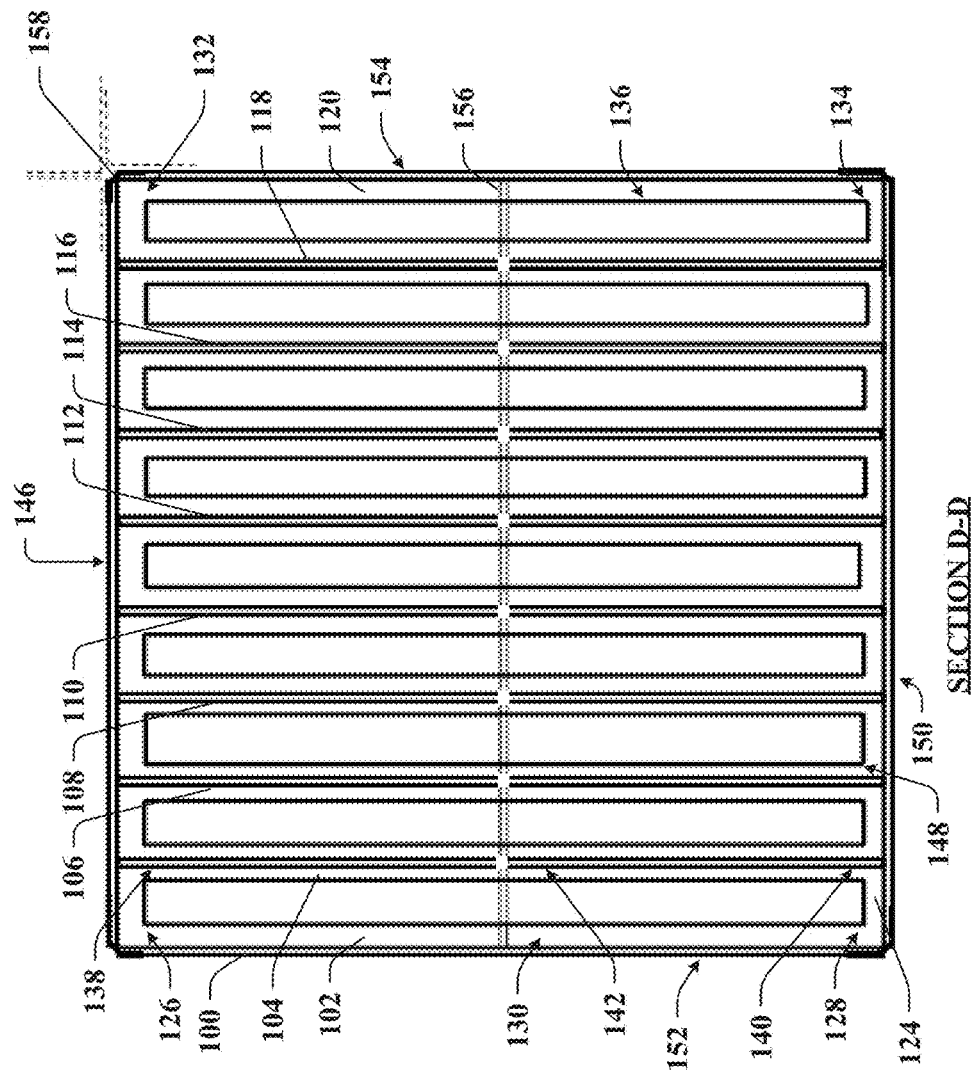
FIG. 5 illustrates a mid-depth view of the monolithic paver of FIG. 1 at section D-D.

Now turning to FIG. 5, illustrated is a mid-depth view of the monolithic paver 100 of FIG. 1 at section D-D. As depicted, the monolithic paver 100 includes the diaphragm 156. Moreover, the webs and the bottom flanges of the structural members (e.g., the first side structural member 102, the interior structural members 104-118, the second side structural member 120, the first end structural member 122, and the second end structural member 124) can be seen in the mid-depth view of the monolithic paver 100. Further, gaps are defined between the bottom flanges in the monolithic paver 100.

Again, reference is made to FIG. 1. As shown in the plan view of the monolithic paver 100, the first side structural member 102, the second side structural member 120, the first end structural member 122, and the second end structural member 124 define corners of the monolithic paver 100, such as a corner 158. Each of the corners can have a curved portion that defines a quarter of a hole. Accordingly, a connection 160 between the monolithic paver 100 (and three other monolithic pavers each of which can be substantially similar to the monolithic paver 100) can be formed.

Figure 6:
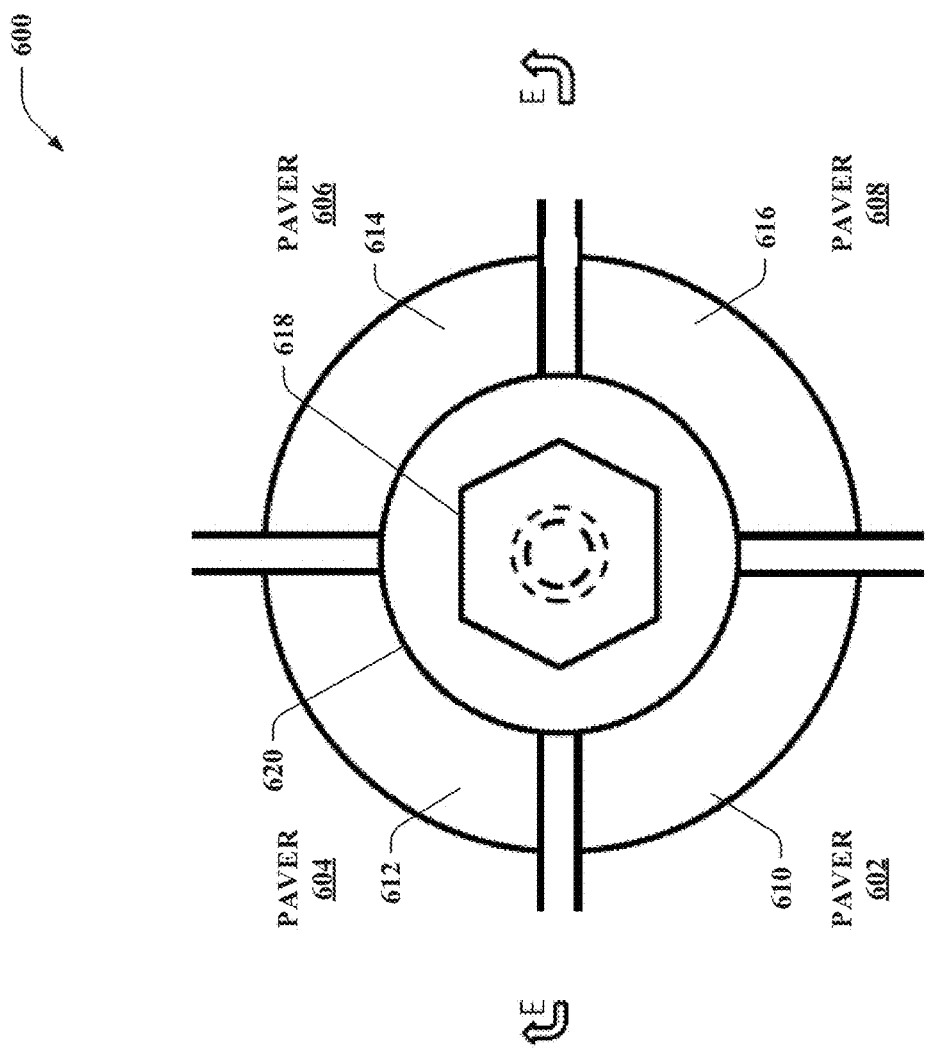
FIG. 6 illustrates a detailed view of a connection formed between four monolithic pavers.

FIG. 6 illustrates a detailed view of a connection 600 (e.g., the connection 160 of FIG. 1) formed between four monolithic pavers, namely, a monolithic paver 602, a monolithic paver 604, a monolithic paver 606, and a monolithic paver 608 (e.g., the monolithic paver 100 and three other monolithic pavers substantially similar to the monolithic paver 100). The monolithic paver 602 includes a curved portion 610, the monolithic paver 604 includes a curved portion 612, the monolithic paver 606 includes a curved portion 614, and the monolithic paver 608 includes a curved portion 616 (e.g., each of the curved portions 610-616 can define a quarter of a hole). Corners of the monolithic pavers 602-608 can be aligned such that a full hole can be defined by the curved portions 610-616 of the four monolithic pavers 602-608. Accordingly, a screw 618 can pass through a washer 620 and the hole defined by curved portions 610-616 at the corners of the monolithic pavers 602-608 to connect the monolithic pavers 602-608 to a pedestal positioned below the monolithic pavers 602-608 (e.g., the pedestal can support the monolithic pavers 602-608). While a screw is described as being used to connect the monolithic pavers 602-608 to a pedestal in various examples set forth herein, it is to be appreciated that any other type of fastener can additionally or alternatively be employed. Thus, the monolithic pavers 602-608 can be joined by a common mechanical fastener to the pedestal located at the intersection of the four monolithic pavers 602-608.

Figure 7:
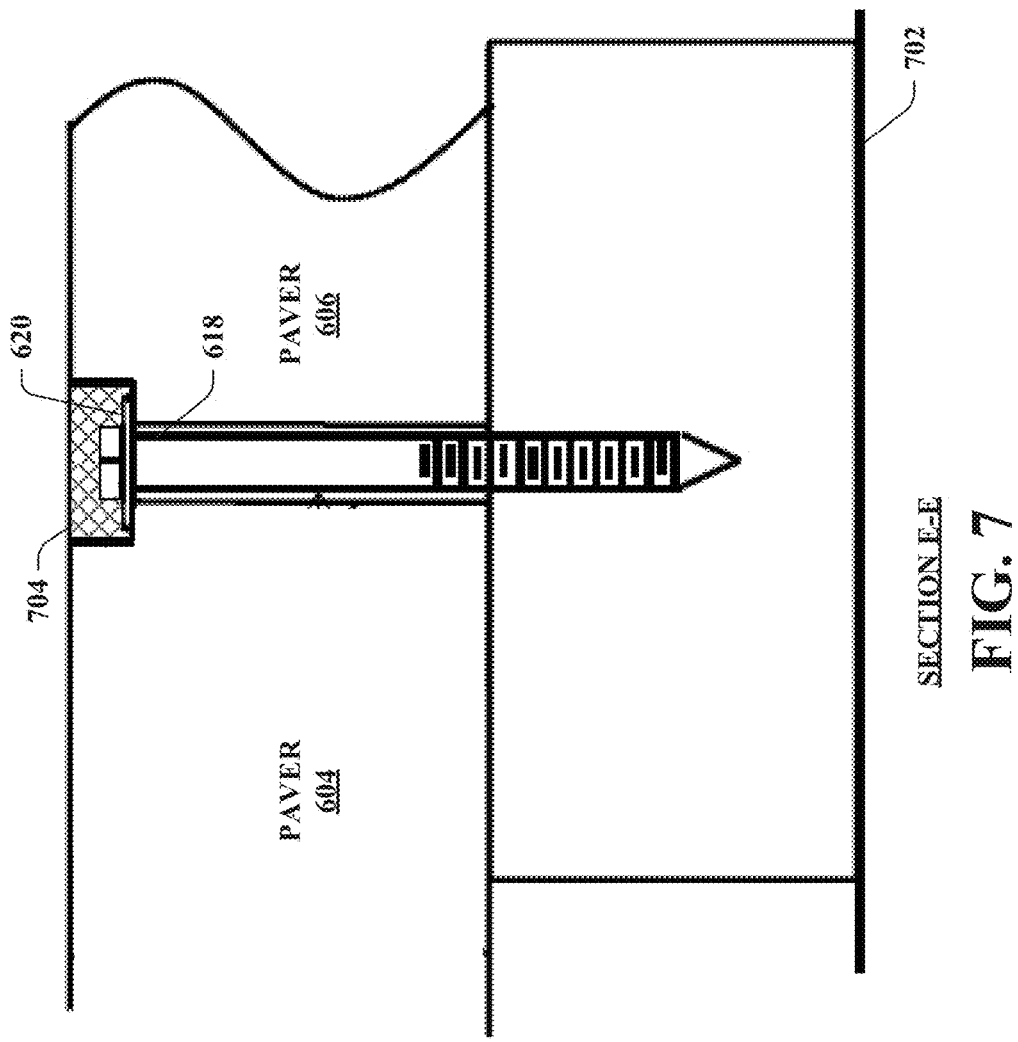
FIGS. 7-8 illustrate exemplary cross-sectional views (section E-E) of the connection formed between the monolithic pavers shown in FIG. 6.

Turning to FIG. 7, illustrated is an exemplary cross-sectional view (section E-E) of the connection 600 formed between the monolithic pavers 602-608 shown in FIG. 6. More particular, FIG. 7 depicts a cross section of the monolithic paver 604 and the monolithic paver 606, which are positioned on top of a pedestal 702. Again, the screw 618 passes through the washer 620 and the hole defined by the monolithic pavers 604 and 606 (as well as the monolithic pavers 602 and 608) and connects to the pedestal 702. In the example shown in FIG. 7, a filler cap 704 is positioned above the screw 618 and washer 620 to conceal such fastener.

Figure 8:
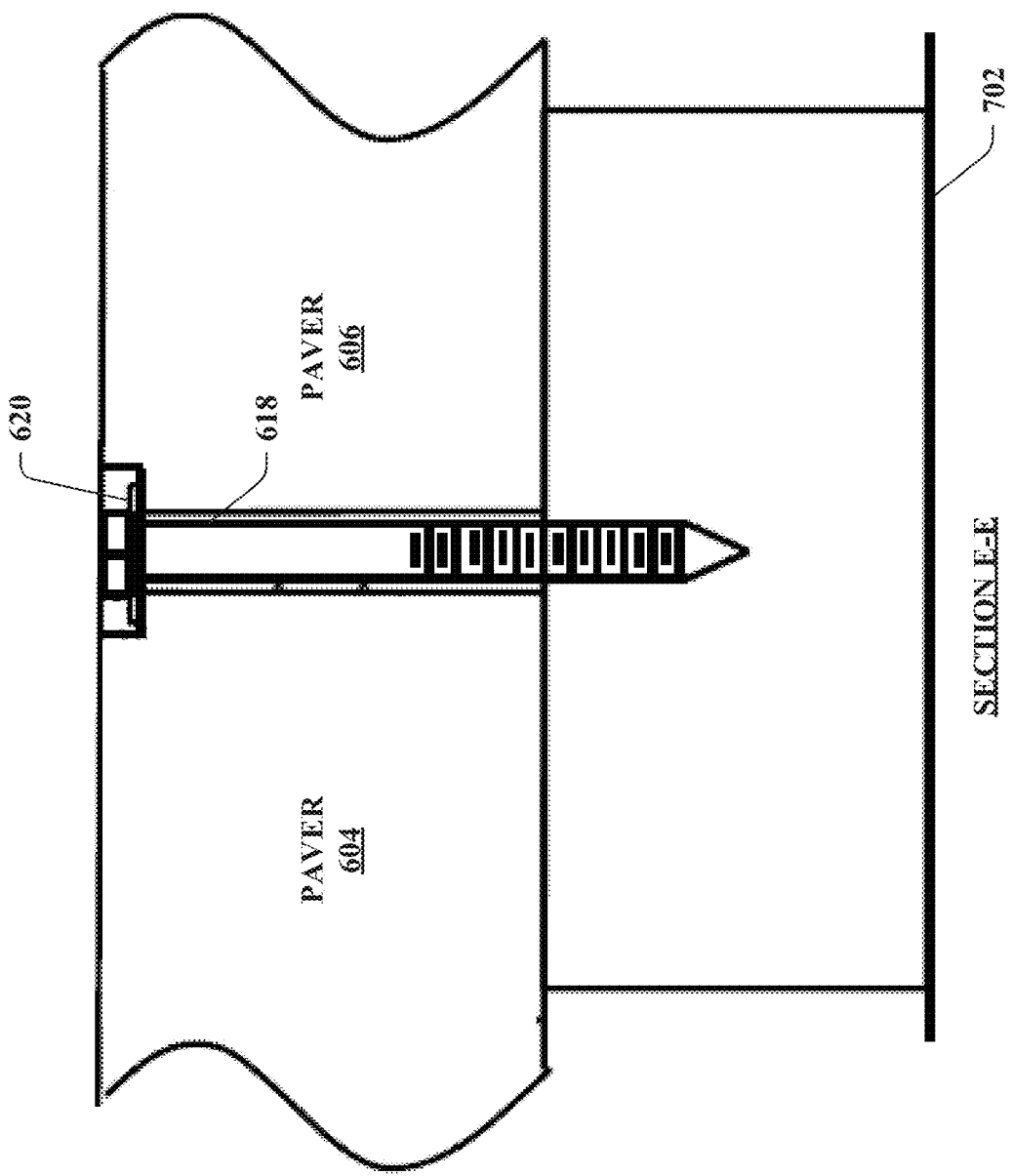

Turning to FIG. 8, illustrated is another exemplary cross-sectional view (section E-E) of the connection 600 formed between the monolithic pavers 602-608 shown in FIG. 6. In the example set forth in FIG. 8, the fastener is not concealed. Thus, the screw 618 and the washer 620 are not covered by a filler cap (such as the filler cap 704 of FIG. 7) in the example shown in FIG. 8.

Figure 9:
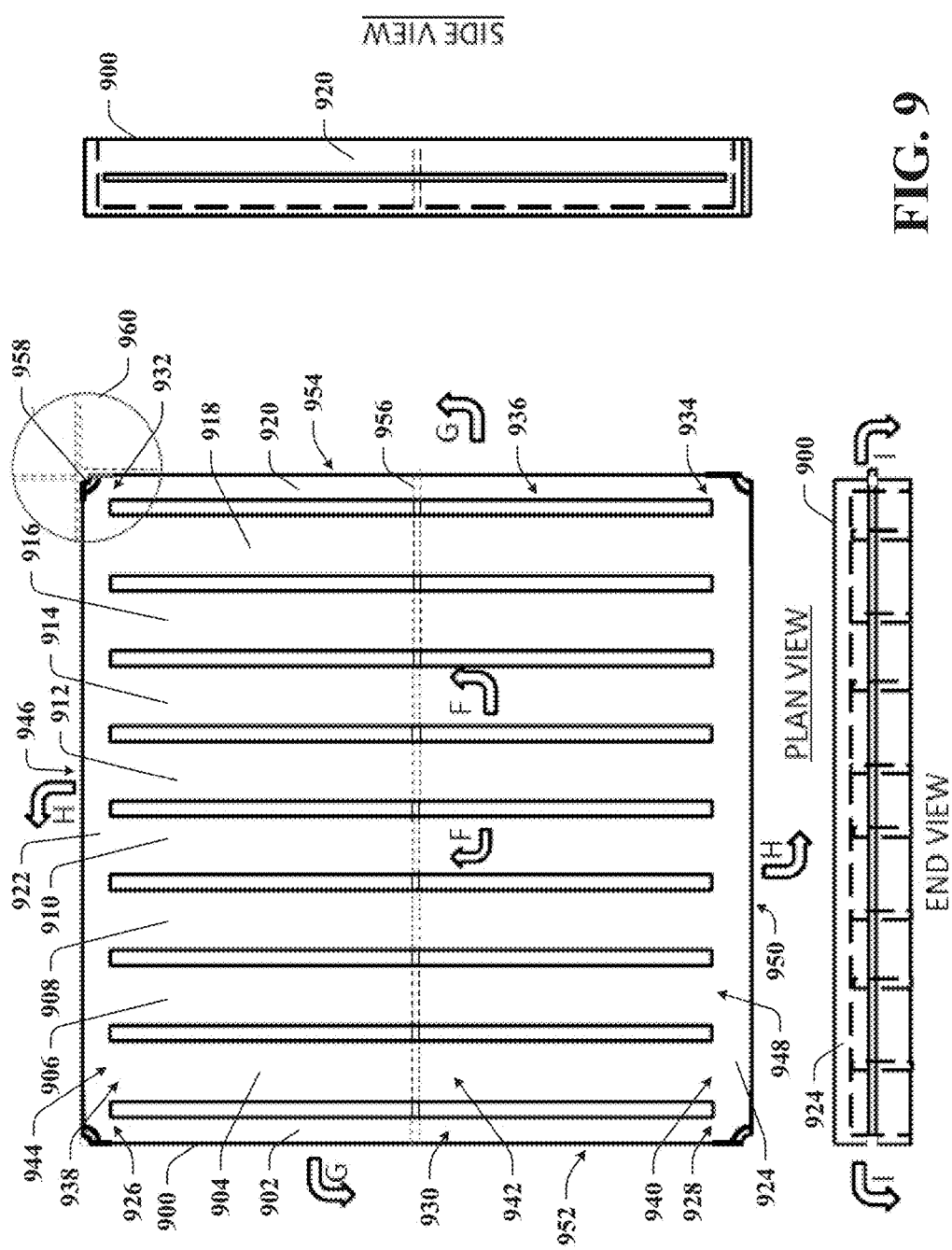
FIG. 9 illustrates another exemplary monolithic paver according to another embodiment.

Referring now to FIG. 9, illustrated is another exemplary monolithic paver 900. Similar to FIG. 1, FIG. 9 includes a plan view, an end view, and a side view of the monolithic paver 900. The monolithic paver 900 is a one-piece paver with no seams, joints, or connections. In the embodiment depicted in FIG. 9, the monolithic paver 900 can be formed via molding. However, it is also contemplated that the monolithic paver 900 can be formed via 3D printing.

The monolithic paver 900 can be similar to the monolithic paver 100 of FIG. 1. Thus, the monolithic paver 900 can again include a first side structural member 902, interior structural members 904-918, a second side structural member 920, a first end structural member 922, a second end structural member 924, and a diaphragm 956. The first side structural member 902 includes a first end 926, a second end 928, and a central portion 930 between the first end 926 and the second end 928 along a length of the first side structural member 902. The second side structural member 920 includes a first end 932, a second end 934, and a central portion 936 between the first end 932 and the second end 934 along a length of the side structural member 920. Likewise, the interior structural members 904-918 include first ends (e.g., a first end 938 of the interior structural member 904), second ends (e.g., a second end 940 of the interior structural member 904), and central portions (e.g., a central portion 942 of the interior structural member 904). The first end structural member 922 includes an interior side 944 and an exterior side 946, and the second end structural member 924 includes an interior side 948 and an exterior side 950. Additionally, the first side structural member 902 includes an exterior side 952, and the second side structural member 920 includes an exterior side 954. The monolithic paver 900 also includes corners, such as a corner 958, with curved portions that each define a quarter of a hole. Accordingly, the monolithic paver 900 can be similarly connected to other pavers and a pedestal as described herein in FIGS. 6-8 (e.g., the monolithic pavers 602-608 can be substantially similar to the monolithic paver 900, the connection 600 can be a connection 960 shown in FIG. 9).

In contrast to the monolithic paver 100 (which includes bottom flanges), the monolithic paver 900 lacks bottom flanges. Accordingly, the monolithic paver 900 can be formed via a molding process. Thus, the first side structural member 902, the interior structural members 904-918, the second side structural member 920, the first end structural member 922, the second end structural member 924, and the diaphragm 956 can be integrally formed in one monolith via molding (or 3D printing).

Figure 10:
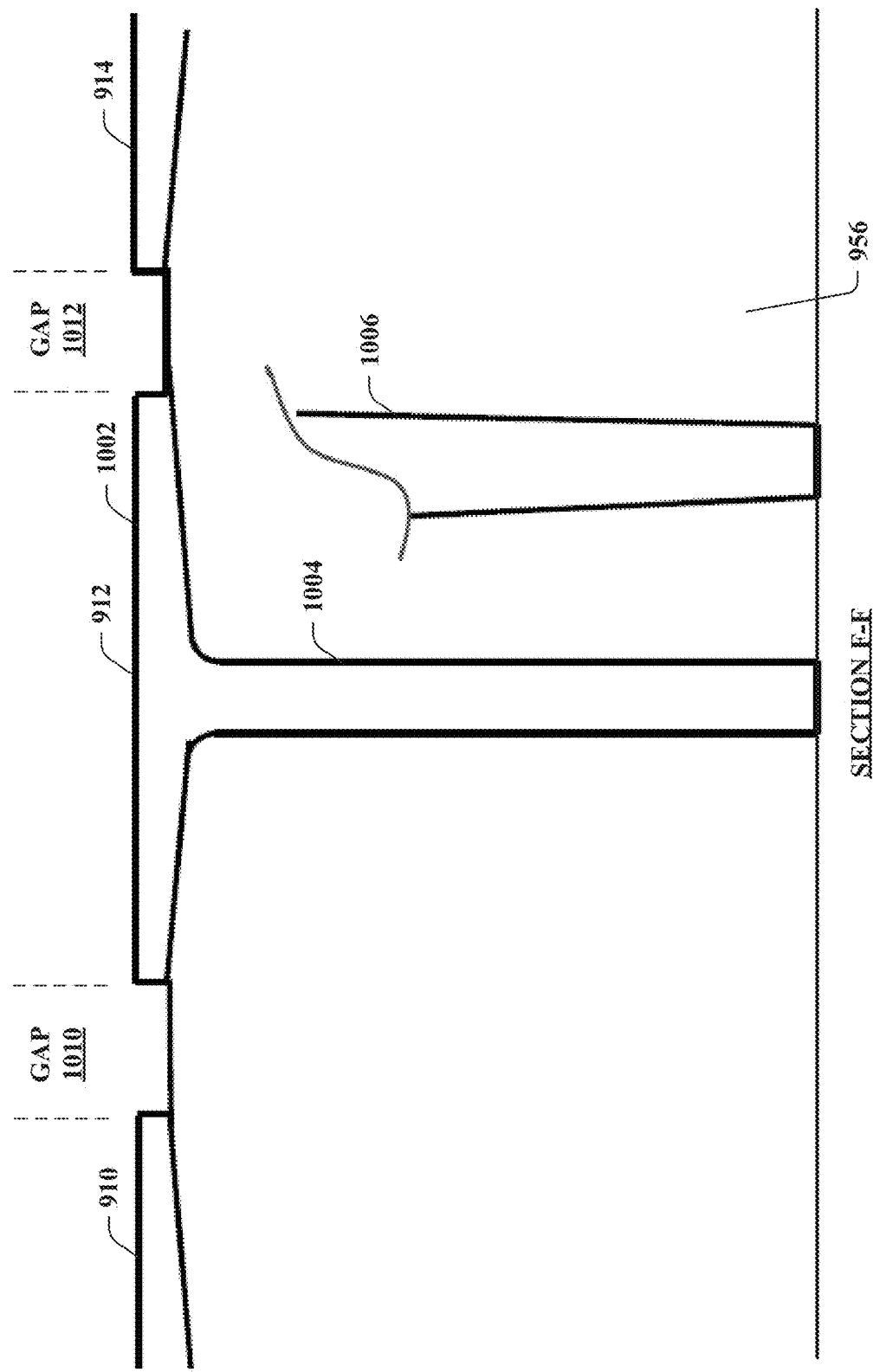
FIG. 10 illustrates a cross-sectional view of a section F-F of the monolithic paver shown in FIG. 9.

FIG. 10 illustrates a cross-sectional view of a section F-F of the monolithic paver 900 shown in FIG. 9. A cross-section of the interior structural member 912 is shown in FIG. 10 along with portions of the interior structural member 910 and the interior structural member 914. A portion of the diaphragm 956 is also depicted in FIG. 10.

Similar to the interior structural member 112 of the monolithic paver 100, the interior structural member 912 includes a top flange 1002 and a web 1004. However, the interior structural member 912 does not include a bottom flange. Other interior structural members 904-910 and 914-918 of the monolithic paver 900 can similarly include respective top flanges and webs, while lacking bottom flanges. Moreover, the diaphragm 956 can connect the first side structural member 902, the interior structural members 904-918, and the second side structural member 920 (e.g., the diaphragm 956 can join the top flanges and the webs).

According to an example, webs of the structural members can be straight webs (represented by the web 1004). However, pursuant to another example, the webs of the structural members can be tapered (represented by an exemplary web 1006). Tapering of a web can enable easier molding of the monolithic paver 900, for instance.

Now referring to FIG. 11, illustrated are exemplary cross-sectional views of a section G of the monolithic paver 900 of FIG. 9. Exemplary cross-sections of a side structural member 1102 and a portion of an interior structural member 1104 are depicted in FIG. 11. For example, the side structural member 1102 can be the first side structural member 902 and the interior structural member 1104 can be the interior structural member 904. According to another example, the side structural member 1102 can be the second side structural member 920 and the interior structural member 1104 can be the interior structural member 918.

The side structural member 1102 includes an exterior side 1106 (e.g., the exterior side 952 of the first side structural member 902, the exterior side 954 of the second side structural member 920). The side structural member 1102 also includes a top flange 1106. As shown in FIG. 11, a gap can be defined (e.g., through the monolithic paver 900) between the side structural member 1102 and the interior structural member 1104.

View (a) of FIG. 11 depicts an example in which a tongue 1110 is formed along the exterior side 1106 of the side structural member 1102. View (b) of FIG. 11 shows an example in which a groove 1112 is formed along the exterior side 1106 of the side structural member 1102. Moreover, view (c) of FIG. 11 illustrates an example in which the exterior side 1106 of the side structural member 1102 is plain (e.g., the exterior side 1108 lacks a tongue and lacks a groove).

Now referring to FIG. 12, illustrated are exemplary cross-sectional views of a section H of the monolithic paver 900 of FIG. 9. Exemplary cross-sections of an end structural member 1202 (e.g., the first end structural member 922 or the second end structural member 924) are shown in FIG. 12. Moreover, the end structural member 1202 includes an exterior side 1204 (e.g., the exterior side 946 of the first end structural member 922 or the exterior side 950 of the second end structural member 924).

View (a) of FIG. 12 shows an example in which a tongue 1206 is formed along the exterior side 1204 of the end structural member 1202. View (b) of FIG. 12 depicts an example in which a groove 1208 is formed along the exterior side 1204 of the end structural member 1202. View (c) of FIG. 12 depicts an example in which the exterior side 1204 of the end structural member 1202 is plain (e.g., the exterior side 1204 lacks a tongue and lacks a groove).

Figure 13:
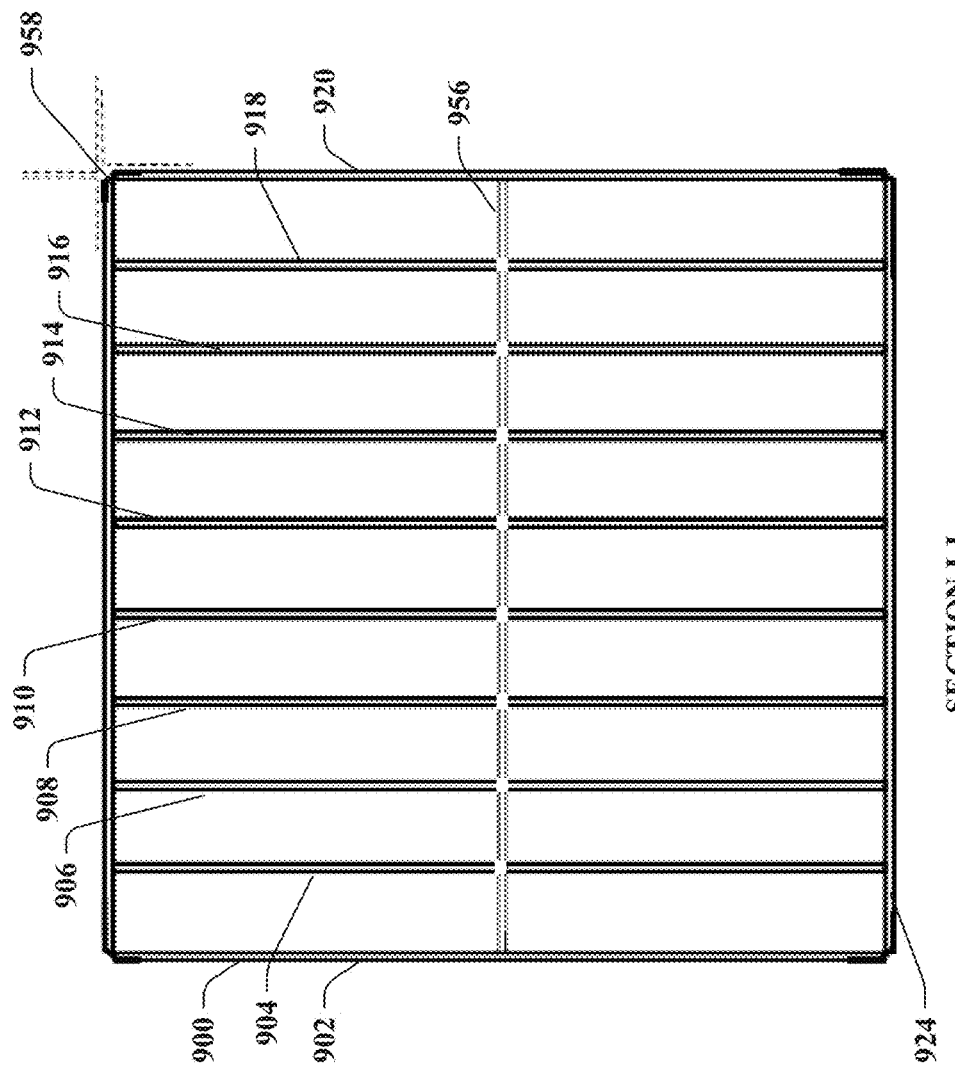
FIG. 13 illustrates a mid-depth view of the monolithic paver of FIG. 9 at section I-I.

Turning to FIG. 13, illustrated is a mid-depth view of the monolithic paver 900 of FIG. 9 at section I-I. As shown, the monolithic paver 900 lacks the bottom flanges when compared to the monolithic paver 100 (as depicted in FIG. 5).

Figure 14:
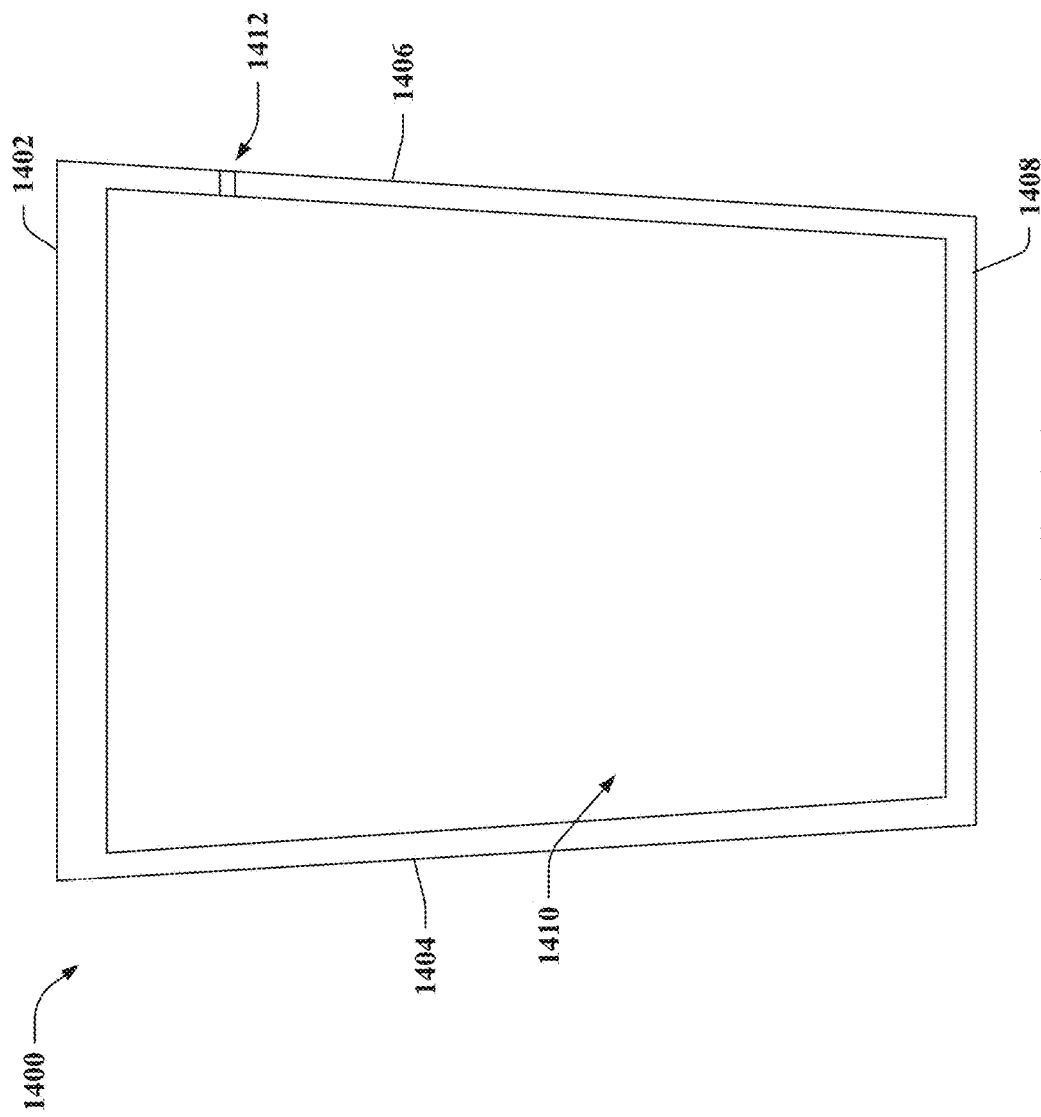
FIG. 14 illustrates a cross-sectional view of another exemplary structural member.

With reference to FIG. 14, illustrated is a cross-sectional view of another exemplary structural member 1400. According to an example, the structural members of the monolithic paver 100 of FIG. 1 (e.g., the first side structural member 102, the second side structural member 120, the interior structural members 104-118, the first end structural member 122, and the second end structural member 124) (or a subset of the structural members of the monolithic paver 100) can be replaced with structural members that are substantially similar to the structural member 1400.

The structural member 1400 includes a top wall 1402, side walls 1404-1406, and a bottom wall 1408 that form a tubular beam. The top wall 1402, the side walls 1404-1406, and the bottom wall 1408 define a cavity 1410. Further, the top wall 1402 can be wider than the bottom wall 1408, as illustrated. Moreover, it is contemplated that a hole 1412 can be defined through the side wall 1406 to allow air flow into and out of the cavity 1410. While one hole is shown in the structural member 1400, it is contemplated that substantially any number of holes can be defined through the structural members. Moreover, such hole(s) can be defined through any of the walls of the structural member 1400.

Figure 16:
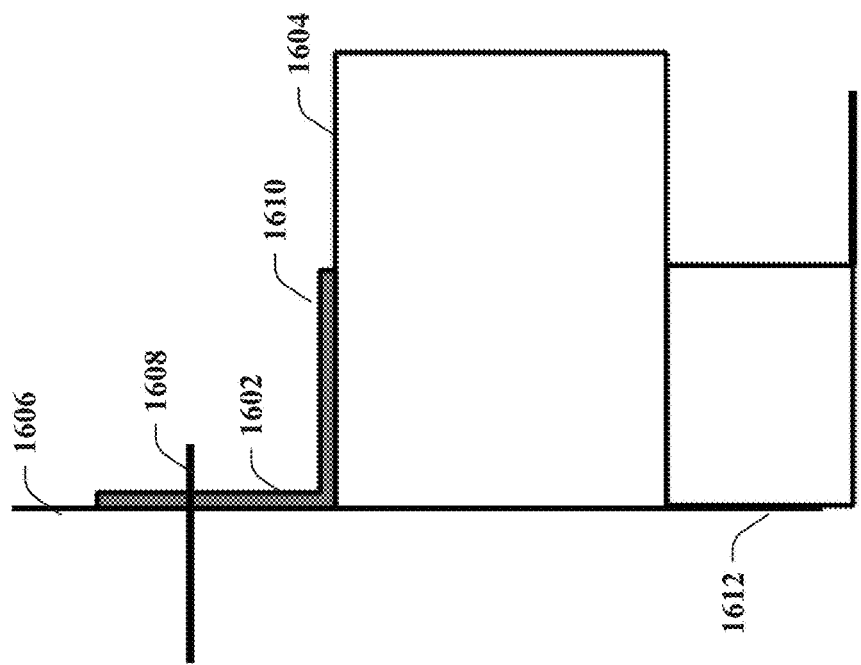
FIG. 16 illustrates another exemplary L-shaped hold-down cleat for a monolithic paver at a boundary.
Figure 15:
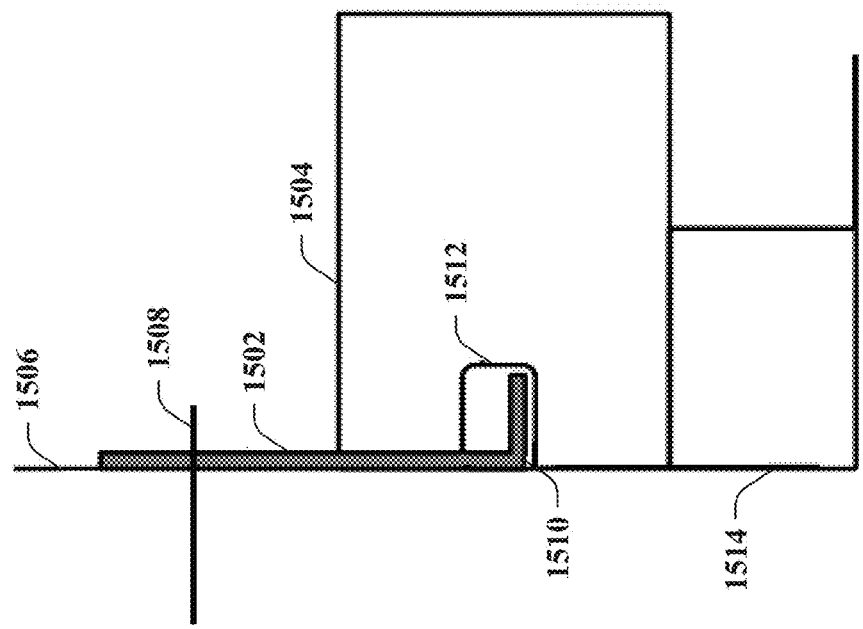
FIG. 15 illustrates an exemplary semi-concealed L-shaped hold-down cleat for a monolithic paver at a boundary.

Reference is now generally made to the monolithic pavers (e.g., the monolithic paver 100, the monolithic paver 900) described herein. The monolithic pavers can be prevented from spreading apart by a peripheral wall containment or by tying pedestals together, for example. The monolithic pavers can further be joined by tongue and groove running continuously in both directions. Where walls occur at the boundaries, it is contemplated that the monolithic pavers can be anchored by hold-down cleats intermittently at joints or continuously as shown in FIGS. 15-16. The hold-down cleats can be semi-concealed or non-concealed.

FIG. 15 illustrates is an exemplary semi-concealed L-shaped hold-down cleat 1502 for a monolithic paver 1504 (e.g., the monolithic paver 100, the monolithic paver 900) at a boundary. The hold-down cleat 1502 can be attached to a wall 1506 (e.g., via a mechanical fastener 1508, adhesive, or the like). A horizontal leg 1510 of the hold-down cleat 1504 can be inserted into a groove 1512 along an exterior side of the monolithic paver 1504. Moreover, the monolithic paver 1504 can be positioned on a support 1514.

Now turning to FIG. 16, illustrated is another exemplary L-shaped hold-down cleat 1602 for a monolithic paver 1604 (e.g., the monolithic paver 100, the monolithic paver 900) at a boundary. Again, the hold-down cleat 1602 can be attached to a wall 1606 (e.g., via a mechanical fastener 1608, adhesive, or the like). A horizontal leg 1610 of the hold-down cleat 1602 can be positioned above a top surface of the monolithic paver 1604. Further, the monolithic paver 1604 can be positioned on a support 1612. In the example shown in FIG. 16, an exterior surface of the monolithic paver 1604 that faces the wall 1606 can be plain (e.g., lack a groove and lack a tongue).

Figure 17:
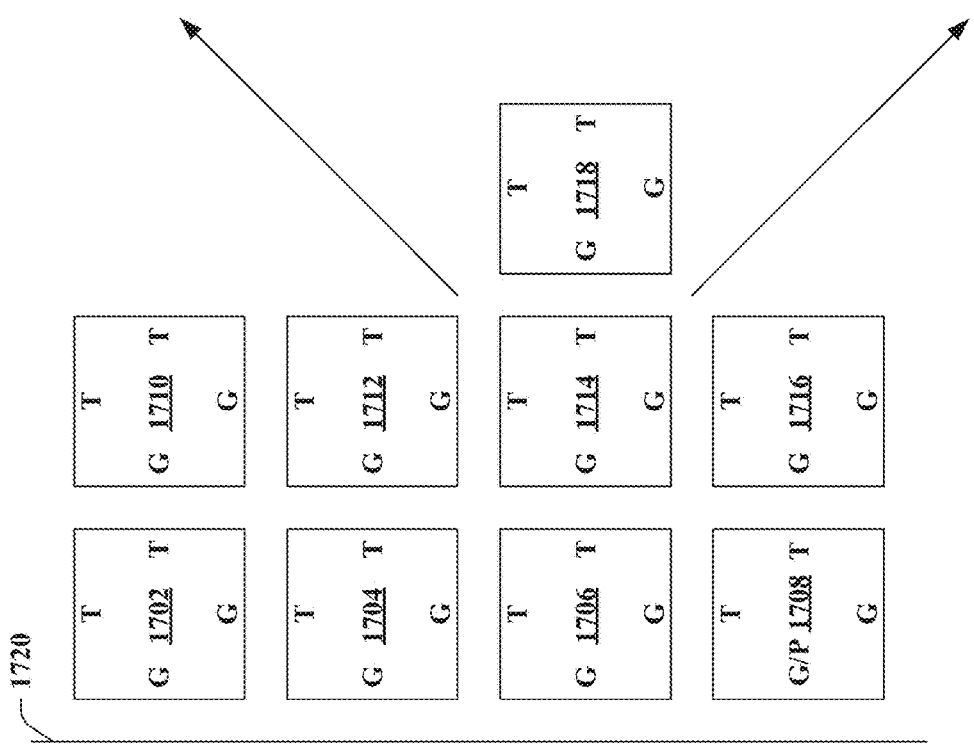
FIG. 17 illustrates an exemplary pattern of installed monolithic pavers.

Now referring to FIG. 17, illustrated is an exemplary pattern of installed monolithic pavers. As depicted, FIG. 17 shows monolithic pavers 1702, 1704, 1706, 1708, 1710, 1712, 1714, 1716, and 1718. It is further contemplated that any additional number of monolithic pavers can be included in the installed pattern. The monolithic pavers 1702-1718 can have tongues formed along adjoining exterior sides (as represented by T's in FIG. 17). Moreover, as shown, the monolithic pavers 1702-1706 and 1710-1718 can have grooves formed along adjoining exterior sides (as represented by G's in FIG. 17). Thus, the tongues and grooves can run continuously in both directions in the exemplary pattern shown in FIG. 17. As depicted, a tongue formed along an exterior side of a second side structural member of the monolithic paver 1714 can connect with a groove formed along an exterior side of a first side structural member of the monolithic paver 1718, a tongue formed along an exterior side of a first end structural member of the monolithic paver 1714 can connect with a groove formed along an exterior side of an end structural member of the monolithic paver 1712, a groove formed along an exterior side a first side structural member of the monolithic paver 1714 can connect with a tongue formed along an exterior side of a side structural member of the monolithic paver 1706, and a groove formed along an exterior side of a second end structural member of the monolithic paver 1714 can connect with a tongue formed along an exterior side of an end structural member of the monolithic paver 1716. It is also contemplated that a tongue formed along a side structural member of a first monolithic paver can be connected with a groove formed along an end structural member of a second monolithic paver. Moreover, it is contemplated that an exterior side of a monolithic paver (e.g., the monolithic paver 1708) adjacent to a wall 1720 can be plain (represented by P's in FIG. 17); yet, the claimed subject matter is not so limited.

Figure 18:
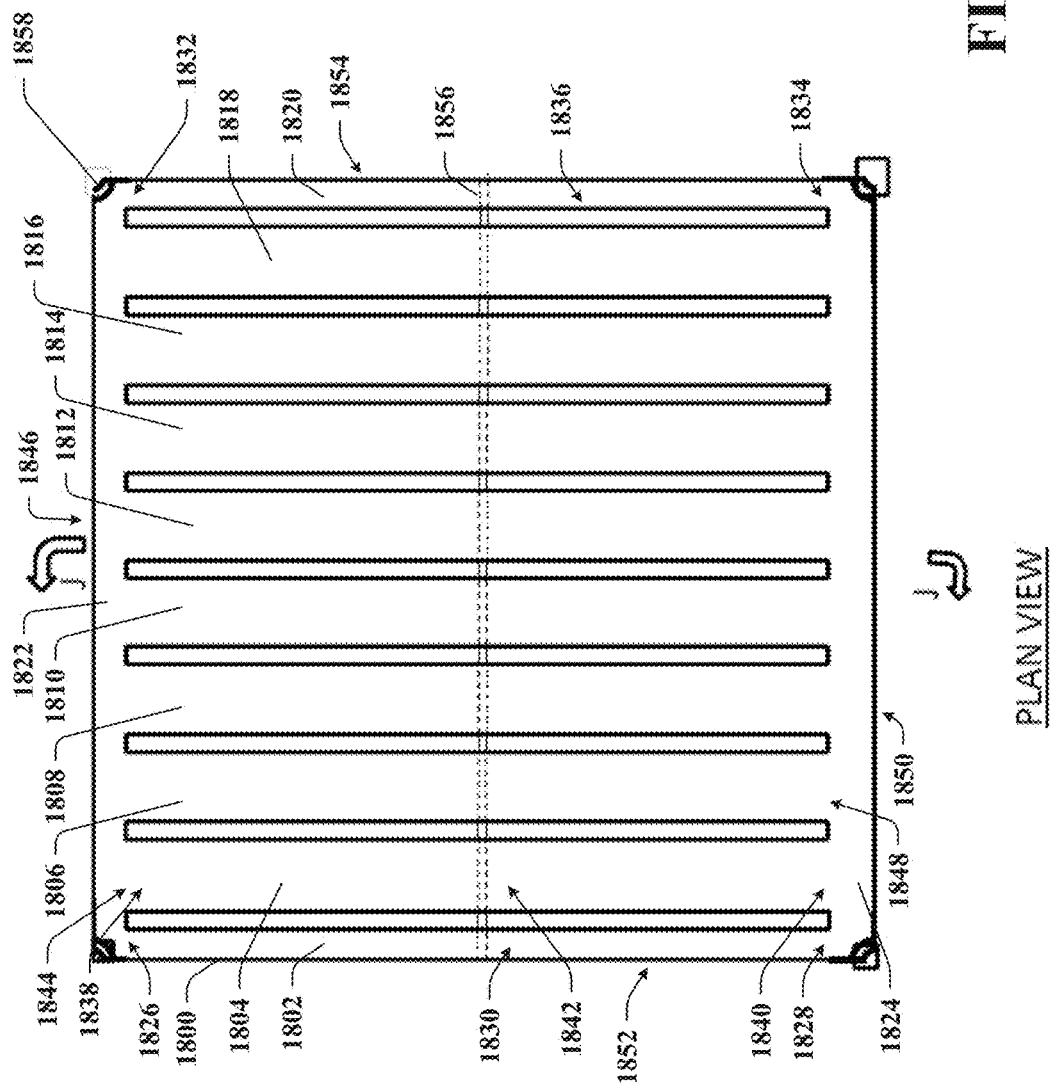
FIG. 18 illustrates a plan view of an exemplary monolithic paver.

Turning to FIG. 18, illustrated is a plan view of an exemplary monolithic paver 1800. The monolithic paver 1800 can be the monolithic paver 100 or the monolithic paver 900. Again, the monolithic paver 1800 is a one-piece paver with no seams, joints, or connections. It is contemplated that the monolithic paver 1800 can be formed via 3D printing or via molding.

Similar to above with respect to the monolithic paver 100 and the monolithic paver 900, the monolithic paver 1800 can include a first side structural member 1802, interior structural members 1804-1818, a second side structural member 1820, a first end structural member 1822, a second end structural member 1824, and a diaphragm 1856. The interior structural members 1804-1818 can be between and in parallel with the first side structural member 1802 and the second side structural member 1820. Moreover, the first end structural member 1822 can be perpendicular with respect to the first side structural member 1802 and the second side structural member 1820, and the second end structural member 1824 can be perpendicular with respect to the first side structural member 1802 and the second side structural member 1820. For instance, a top surface of the monolithic paver 1800 can be rectangular with gaps defined there through. The gaps through the monolithic paver 1800 can be defined between the first side structural member 1802, the interior structural members 1804-1818, and the second side structural member 1820.

The first side structural member 1802 includes a first end 1826, a second end 1828, and a central portion 1830 between the first end 1826 and the second end 1828 along a length of the first side structural member 1802. The second side structural member 1820 includes a first end 1832, a second end 1834, and a central portion 1836 between the first end 1832 and the second end 1834 along a length of the side structural member 1820. Likewise, the interior structural members 1804-1818 include first ends (e.g., a first end 1838 of the interior structural member 1804), second ends (e.g., a second end 1840 of the interior structural member 1804), and central portions (e.g., a central portion 1842 of the interior structural member 1804). The first end structural member 1822 includes an interior side 1844 and an exterior side 1846, and the second end structural member 1824 includes an interior side 1848 and an exterior side 1850. Additionally, the first side structural member 1802 includes an exterior side 1852, and the second side structural member 1820 includes an exterior side 1854. The monolithic paver 1800 also includes corners, such as a corner 1858, with curved portions that each define a quarter of a hole. Accordingly, the monolithic paver 1800 can be similarly connected to other pavers and a pedestal as described herein in FIGS. 6-8 (e.g., the monolithic pavers 602-608 can be substantially similar to the monolithic paver 1800).

The first side structural member 1802, the interior structural members 1804-1818, the second side structural member 1820, the first end structural member 1822, the second end structural member 1824, and the diaphragm 1856 can be integrally formed in one monolith. According to an example, the monolithic paver 1800 can include bottom flanges (e.g., the monolithic paver 1800 can be the monolithic paver 100). By way of another example, the monolithic paver 1800 can lack bottom flanges (e.g., the monolithic paver 1800 can be the monolithic paver 900).

FIGS. 19-26 illustrate cross-sectional views of exemplary structural members (section J-J) of the monolithic paver 1800 shown in FIG. 18. In particular, cross-sectional views of examples that include the interior structural member 1812 as well as portions of the first end structural member 1822 and the second end structural member 1824 which are integrally formed together are depicted in FIGS. 19-26. It is contemplated that the other interior structural members 1804-1810 and 1814-1818 can be substantially similar to the interior structural member 1812 in the monolithic paver 1800. Additionally, it is to be appreciated that the first side structural member 1802, the second side structural member 1820, the first end structural member 1822, and/or the second end structural member 1824 can be substantially similar to the interior structural member 1812 in the monolithic paver 1800; however, according to other examples, the interior structural members 1804-1818 can differ from the first side structural member 1802, the second side structural member 1820, the first end structural member 1822, and/or the second end structural member 1824 in the monolithic paver 1800.

Figure 19:
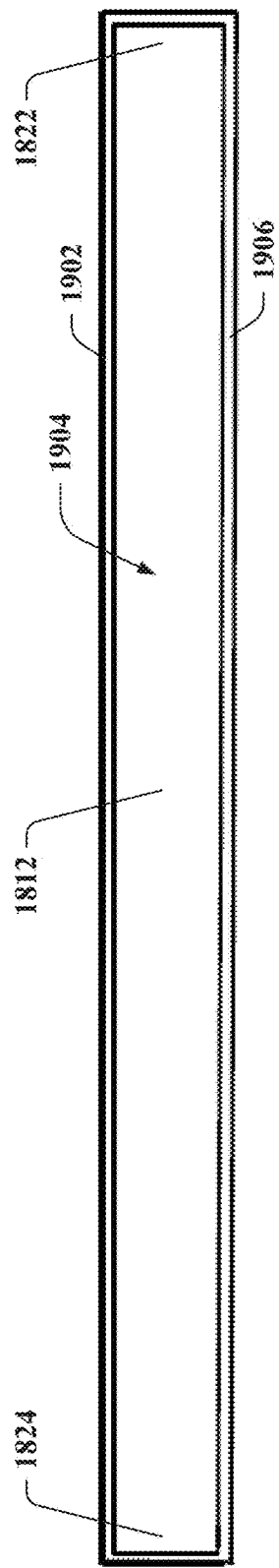
Figure 20:
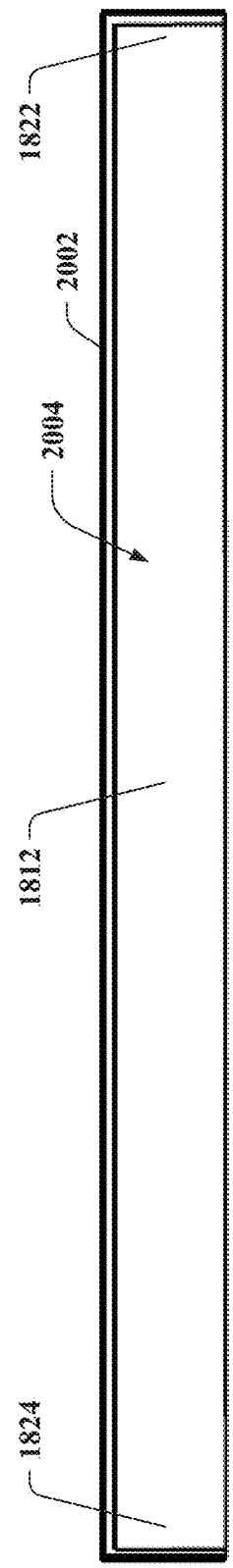

More particularly, FIGS. 19-20 illustrate exemplary constant depth structural members. In the examples shown in FIGS. 19-20, the depth of the interior structural member 1812 is uniform across the length of the interior structural member 1812. The depth is also uniform across the portions of the first end structural member 1822 and the second end structural member 1824 integrally formed with the interior structural member 1812 (e.g., the depth is uniform across widths of the first end structural member 1822 and the second end structural member 1824 in the exemplary cross-sectional views). FIG. 19 shows an example where the interior structural member 1812 is a constant depth structural member that includes a top flange 1902, a web 1904, and a bottom flange 1906. Moreover, FIG. 20 depicts the interior structural member 1812 being an exemplary constant depth structural member that includes a top flange 2002 and a web 2004; in this example, the interior structural member 1812 lacks a bottom flange.

Moreover, FIGS. 21-24 illustrate exemplary varying depth structural members. The depth of the interior structural member 1812 varies across the length of the interior structural member 1812 in the examples depicted in FIGS. 21-24. The depth of the interior structural member 1812 can vary to enable material to be conserved in the resulting monolithic paver (e.g., the monolithic paver 1800) that includes such interior structural member 1812.

FIG. 21 shows an example where the interior structural member 1812 is a varying depth structural member that includes a top flange 2102, a web 2104, and a bottom flange 2106. A bottom edge of the interior structural member 1812 of FIG. 21 (e.g., the bottom flange 2106) is curved along the length of the interior structural member 1812, with the interior structural member 1812 having a local maximum depth 2108 at (or near) a center of a central portion of the interior structural member 1812 and local minimum depths 2110-2112 towards (or at) a first end and a second end of the interior structural member 1812 (at or near the interior side 1844 of the first end structural member 1822 and at or near the interior side 1848 of the second end structural member 1824).

FIG. 22 depicts another example of the interior structural member 1812. In the example of FIG. 22, the interior structural member 1812 is a varying depth structural member that includes a top flange 2202, a web 2204, and a bottom flange 2206. Moreover, in the example of FIG. 22, a bottom edge of the interior structural member 1812 again has a local maximum depth 2208 at (or near) a center of a central portion of the interior structural member 1812 and local minimum depths 2210-2212 towards (or at) a first end and a second end of the interior structural member 1812 (at or near the interior side 1844 of the first end structural member 1822 and at or near the interior side 1848 of the second end structural member 1824). Rather than the bottom edge being curved between the local minimum and maximum depths as set forth in the example of FIG. 21, the bottom edge is straight between the local minimum and maximum depths in the example of FIG. 22.

FIG. 23 shows another example of the interior structural member 1812; as depicted in this example, the interior structural member 1812 is a varying depth structural member that includes a top flange 2302 and a web 2304. The interior structural member 1812 of FIG. 23 is similar to the interior structural member 1812 of FIG. 21, but lacks a bottom flange. Moreover, FIG. 23 depicts yet another example of the interior structural member 1812; again, this example shows the interior structural member 1812 being a varying depth structural member that includes a top flange 2402 and a web 2404. The interior structural member 1812 of FIG. 24 is similar to the interior structural member 1812 of FIG. 22, but does not include a bottom flange.

Figure 25:
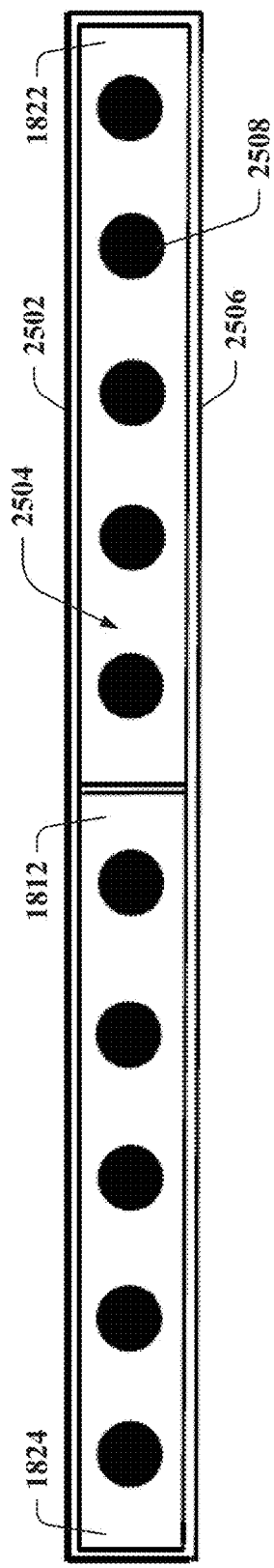
Figure 26:
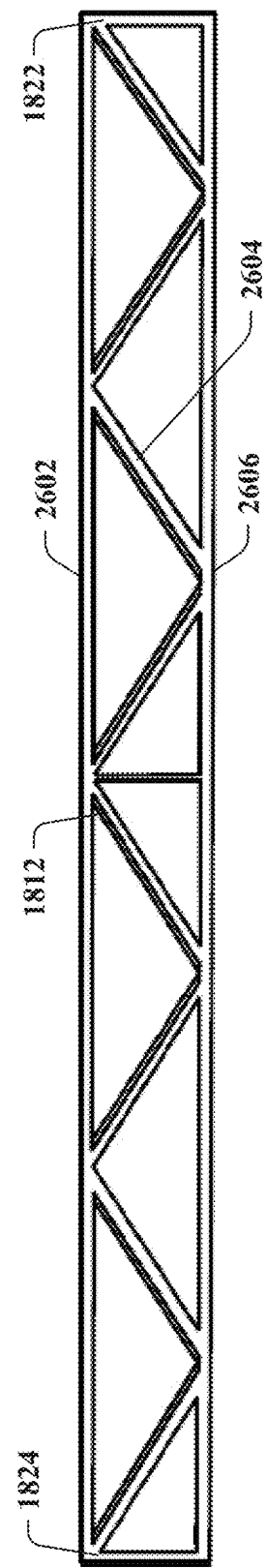

Moreover, FIGS. 25-26 illustrate exemplary open web structural members. The open web designs of the structural members of FIGS. 25-26 again enable material to be conserved in monolithic pavers (e.g., the monolithic paver 1800) that includes such structural members.

FIG. 25 shows an example where the interior structural member 1812 is an open web structural member that includes a top flange 2502, a web 2504, and a bottom flange 2506, which are monolithic with the monolithic paver 1800. The web 2504 includes holes (such as a hole 2508) defined there through. While the interior structural member 1812 of FIG. 25 is depicted as having ten holes defined through the web 2504, it is contemplated that the web 2504 can include substantially any number of holes greater than or less than ten. Further, while FIG. 25 shows the interior structural member 1812 having the bottom flange 2506, it is contemplated that the interior structural member 1812 alternatively can lack a bottom flange.

FIG. 26 depicts an example where the interior structural member 1812 is an open web structural member that includes a top flange 2602 (i.e., a top chord), a web 2604, and a bottom flange 2606 (i.e., a bottom chord), which are monolithic with the monolithic paver 1800. The open web structural member illustrated in FIG. 26 has a trussed structure; accordingly, the monolithic paver 1800 can include monolithic trusses, as depicted in FIG. 26. The web 2604 of the interior structural member 1812 includes a set of separate web members (as opposed to a continuous plate). Thus, the web 2604 includes a plurality of web members diagonally oriented between the top flange 2602 and the bottom flange 2606. Moreover, the first end structural member 1822 and the second end structural member 1824 can include vertically oriented web members in the example shown in FIG. 26.

Figure 27:
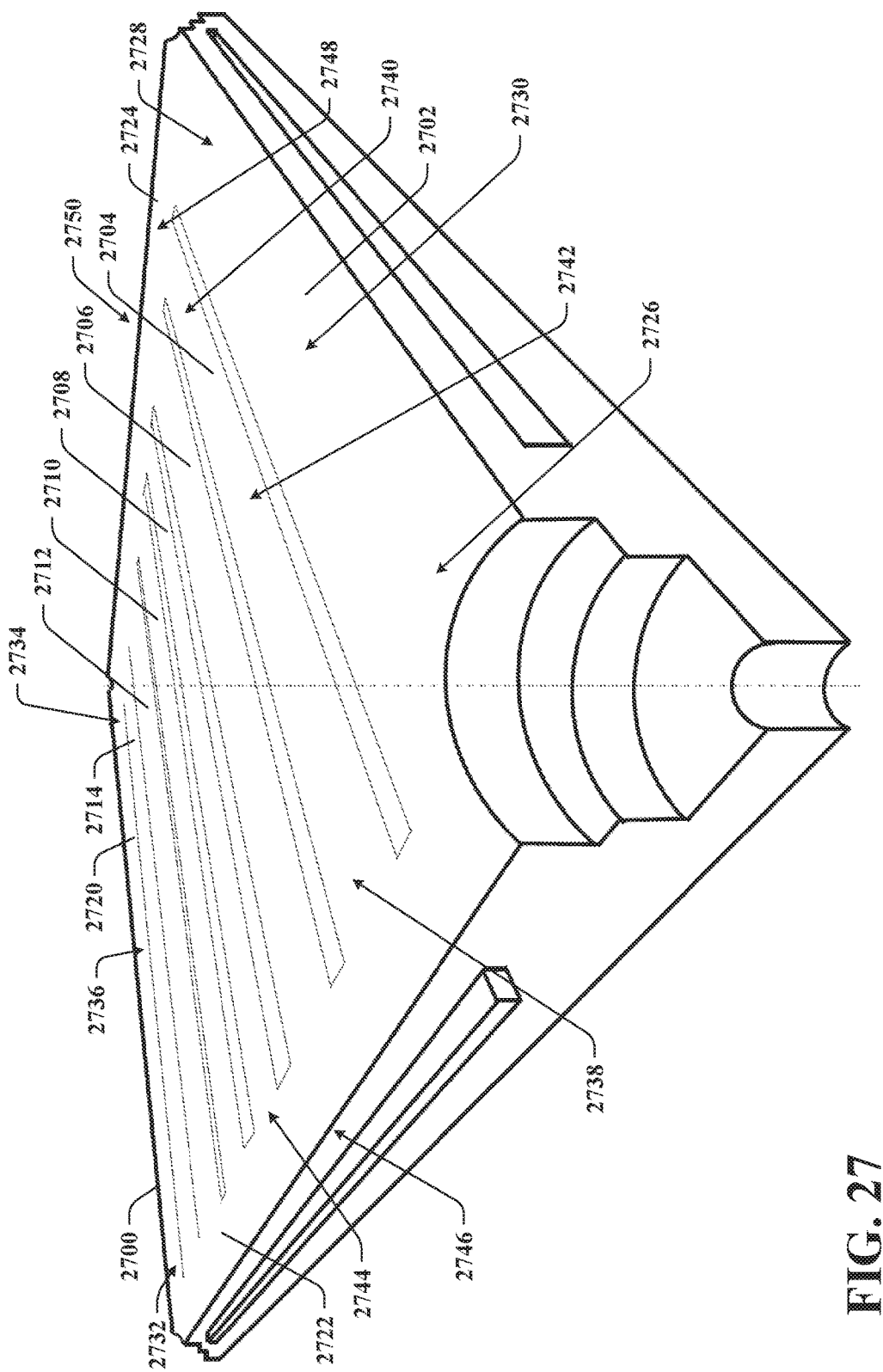
FIG. 27 illustrates a perspective view of an exemplary monolithic paver.

FIG. 27 illustrates a perspective view of an exemplary monolithic paver 2700. The monolithic paver 2700 can be similar to the monolithic paver 100, the monolithic paver 900, and/or the monolithic paver 1800. The monolithic paver 2700 can include a first side structural member 2702, interior structural members 2704-2714, a second side structural member 2720, a first end structural member 2722, and a second end structural member 2724. The first side structural member 2702 includes a first end 2726, a second end 2728, and a central portion 2730 between the first end 2726 and the second end 2728 along a length of the first side structural member 2702. The second side structural member 2720 includes a first end 2732, a second end 2734, and a central portion 2736 between the first end 2732 and the second end 2734 along a length of the side structural member 2720. Likewise, the interior structural members 2704-2714 include first ends (e.g., a first end 2738 of the interior structural member 2704), second ends (e.g., a second end 2740 of the interior structural member 2704), and central portions (e.g., a central portion 2742 of the interior structural member 2704). The first end structural member 2722 includes an interior side 2744 and an exterior side 2746, and the second end structural member 2724 includes an interior side 2748 and an exterior side 2750. A top surface of the monolithic paver 2700 can optionally include gaps therethrough defined between the central portion 2730 of the first side structural member 2702, the central portions of the interior structural members 2704-2714, and the central portion 2736 of the second side structural member 2720.

Further, as used herein, the term "exemplary" is intended to mean "serving as an illustration or example of something."

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A monolithic paver, comprising:
    a first side structural member;
    a second side structural member;
    interior structural members, the interior structural members are between and in parallel with the first side structural member and the second side structural member;
    a first end structural member, the first end structural member is perpendicular with respect to the first side structural member and the second side structural member; and
    a second end structural member, the second end structural member is perpendicular with respect to the first side structural member and the second side structural member;
    wherein the monolithic paver is one monolith formed of a single material;
    wherein the first side structural member, the second side structural member, the interior structural members, the first end structural member, and the second end structural member are integrally formed in the one monolith;
    wherein the interior structural members are open web structural members;
    wherein a top surface of the monolithic paver comprises top surfaces of the first side structural member, the second side structural member, the interior structural members, the first end structural member, and the second end structural member; and
    wherein the top surfaces of the first side structural member, the second side structural member, the interior structural members, the first end structural member, and the second end structural member are substantially coplanar.

2. The monolithic paver of claim 1, the first side structural member and the second side structural member are open web structural members.

3. The monolithic paver of claim 1, the first end structural member and the second end structural member are open web structural members.

4. The monolithic paver of claim 1, each of the interior structural members further comprises:
    a top flange, wherein a top surface of the top flange is the top surface of the interior structural member; and
    a web, wherein one or more holes are defined through the web.

5. The monolithic paver of claim 4, each of the interior structural members further comprises a bottom flange.

6. The monolithic paver of claim 4, the interior structural members lack bottom flanges.

7. The monolithic paver of claim 1, each of the interior structural members further comprises:
    a top flange, wherein a top surface of the top flange is the top surface of the interior structure member;
    a bottom flange; and
    a web, the web further comprises a set of separate web members, the set of separate web members comprises a plurality of diagonally oriented web members between the top flange and the bottom flange.

8. The monolithic paver of claim 1, gaps through the monolithic paver are defined between the first side structural member, the interior structural members, and the second side structural member.

9. The monolithic paver of claim 1, further comprising a diaphragm that joins the interior structural members, the diaphragm is integrally formed in the one monolith with the first side structural member, the second side structural member, the interior structural members, the first end structural member, and the second end structural member.

10. The monolithic paver of claim 1, wherein the top surface of the monolithic paver is rectangular with gaps defined there through.

11. A monolithic paver, comprising:
a first side structural member;
a second side structural member;
interior structural members, the interior structural members are between and in parallel with the first side structural member and the second side structural member;
a first end structural member, the first end structural member is perpendicular with respect to the first side structural member and the second side structural member; and
a second end structural member, the second end structural member is perpendicular with respect to the first side structural member and the second side structural member;
wherein the monolithic paver is one monolith formed of a single material;
wherein the first side structural member, the second side structural member, the interior structural members, the first end structural member, and the second end structural member are integrally formed in the one monolith;
wherein gaps through the monolithic paver are defined between the first side structural member, the interior structural members, and the second side structural member;
wherein a top surface of the monolithic paver comprises top surfaces of the first side structural member, the second side structural member, the interior structural members, the first end structural member, and the second end structural member; and
wherein the top surfaces of the first side structural member, the second side structural member the interior structural members the first end structural member, and the second end structural member are substantially coplanar.

12. The monolithic paver of claim 11, the interior structural members are open web structural members.

13. The monolithic paver of claim 11, the interior structural members are varying depth structural members, wherein depths of the interior structural members vary across lengths of the interior structural members.

14. The monolithic paver of claim 13, the first side structural member and the second side structural member are varying depth structural members.

15. The monolithic paver of claim 13, the first end structural member and the second end structural member are varying depth structural members.

16. The monolithic paver of claim 11, the interior structural members are constant depth structural members, wherein depths of the interior structural members are uniform across lengths of the interior structural members.

17. The monolithic paver of claim 11, the interior structural members are tubular beams.

18. A monolithic paver, comprising:
a first side structural member, the first side structural member having a first end, a second end, and a central portion between the first end and the second end along a length of the first side structural member;
interior structural members, the interior structural members having first ends, second ends, and central portions between the first ends and the second ends along lengths of the interior structural members;
a second side structural member, the second side structural member having a first end, a second end, and a central portion between the first end and the second end along a length of the second side structural member;
a first end structural member, the first end structural member having an interior side; and
a second end structural member, the second end structural member having an interior side;
wherein the monolithic paver is one monolith formed of a single material;
wherein the interior structural members are between the first side structural member and the second side structural member;
wherein the first end of the first side structural member, the first ends of the interior structural members, and the first end of the second side structural member are integrally formed with the interior side of the first end structural member;
wherein the second end of the first side structural member, the second ends of the interior structural members, and the second end of the second side structural member are integrally formed with the interior side of the second end structural member;
wherein the first side structural member, the interior structural members, the second side structural member, the first end structural member, and the second end structural member are integrally formed in the one monolith;
wherein the interior structural members are open web structural members;
wherein a top surface of the monolithic paver comprises top surfaces of the first side structural member, the second side structural member, the interior structural members, the first end structural member, and the second end structural member; and
wherein the top surfaces of the first side structural member, the second side structural member, the interior structural members, the first end structural member, and the second end structural member are substantially coplanar.

19. The monolithic paver of claim 18, each of the interior structural members further comprises:
a top flange, wherein a top surface of the top flange is the top surface of the interior structural member; and
a web, wherein one or more holes are defined through the web.

20. The monolithic paver of claim 18, each of the interior structural members further comprises:
a top flange, wherein a top surface of the top flange is the top surface of the interior structural member;
a bottom flange; and
a web, the web further comprises a set of separate web members, the set of separate web members comprises a plurality of diagonally oriented web members between the top flange and the bottom flange.

21. The monolithic paver of claim 18, wherein the top surface of the monolithic paver has gaps therethrough defined between the central portion of the first side structural member, the central portions of the interior structural members, and the central portion of the second side structural member.

22. The monolithic paver of claim 18, wherein the top surface of the monolithic paver lacks gaps between the top surfaces of the first side structural member, the interior structural members, and the second side structural member.

* * * * *